US007936491B2

(12) United States Patent
Koda et al.

(10) Patent No.: US 7,936,491 B2
(45) Date of Patent: May 3, 2011

(54) HOLOGRAM RECORDING MEDIUM, HOLOGRAM RECORDING APPARATUS AND METHOD, AND COMPUTER PROGRAM

(75) Inventors: Takeshi Koda, Saitama (JP); Nobuyuki Takakuwa, Saitama (JP); Yasuko Fukuda, Saitama (JP); Kazuo Kuroda, Saitama (JP)

(73) Assignee: Pioneer Corporation, Tokyo (JP)

( * ) Notice: Subject to any disclaimer, the term of this patent is extended or adjusted under 35 U.S.C. 154(b) by 395 days.

(21) Appl. No.: 12/091,154

(22) PCT Filed: Oct. 24, 2006

(86) PCT No.: PCT/JP2006/321097
§ 371 (c)(1),
(2), (4) Date: Jul. 10, 2008

(87) PCT Pub. No.: WO2007/049578
PCT Pub. Date: May 3, 2007

(65) Prior Publication Data
US 2009/0141323 A1 Jun. 4, 2009

(30) Foreign Application Priority Data
Oct. 24, 2005 (JP) .................. 2005-308283

(51) Int. Cl.
*G03H 1/28* (2006.01)
(52) U.S. Cl. ......................... 359/24; 369/103
(58) Field of Classification Search .............. 359/22, 359/24–25, 35; 369/44.37, 102, 103, 112, 369/125, 272; 365/216
See application file for complete search history.

(56) References Cited

U.S. PATENT DOCUMENTS

| 7,436,564 B2 * | 10/2008 | Gomi et al. | 359/213.1 |
| 7,600,689 B2 * | 10/2009 | Tsikos et al. | 235/462.43 |

FOREIGN PATENT DOCUMENTS

| JP | 4-93881 | 3/1992 |
| JP | 2004-227620 | 8/2004 |
| JP | 2005-071528 | 3/2005 |
| JP | 2005-196826 | 7/2005 |
| JP | 2005-327393 | 11/2005 |
| JP | 2006-284853 | 10/2006 |

OTHER PUBLICATIONS

International Search Report for International Application No. PCT/JP2006/321097, mailed Jan. 23, 2007.

* cited by examiner

*Primary Examiner* — Stephone B Allen
*Assistant Examiner* — Jennifer L. Doak
(74) *Attorney, Agent, or Firm* — Nixon & Vanderhye, PC

(57) ABSTRACT

A hologram recording apparatus (300) is provided with: a recording device (100) for recording record information into a hologram recording medium (1); a measuring device (325) for measuring a time elapsed from when the recording of the record information is stopped to when the recording of the record information is restarted; a first controlling device (354) for controlling the recording device to multiplex-record the record information, if the measured elapsed time is shorter than a time length in which the record information can be multiplex-recorded; and a second controlling device (354) for controlling the recording device not to multiplex-record the record information, if the measured elapsed time is longer than the time length in which the record information can be multiplex-recorded.

17 Claims, 12 Drawing Sheets

[FIG. 1]
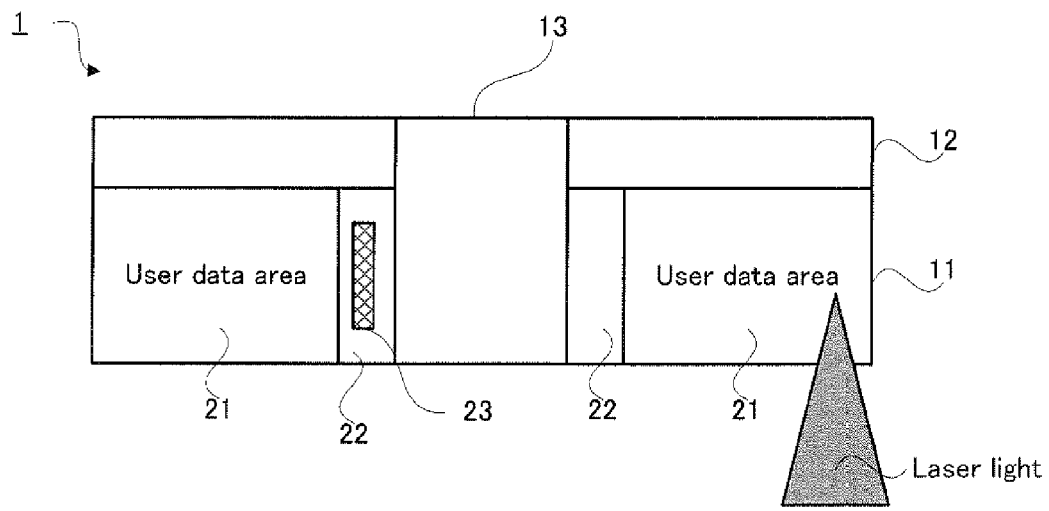
(a)
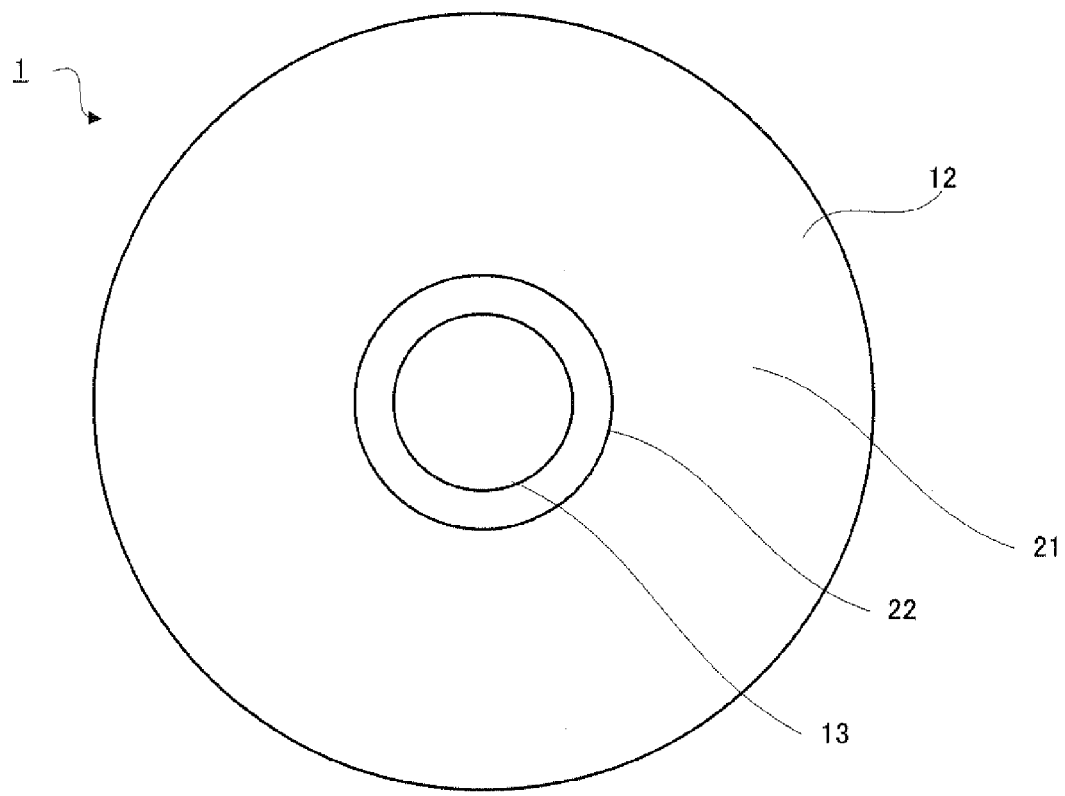
(b)

[FIG. 2]
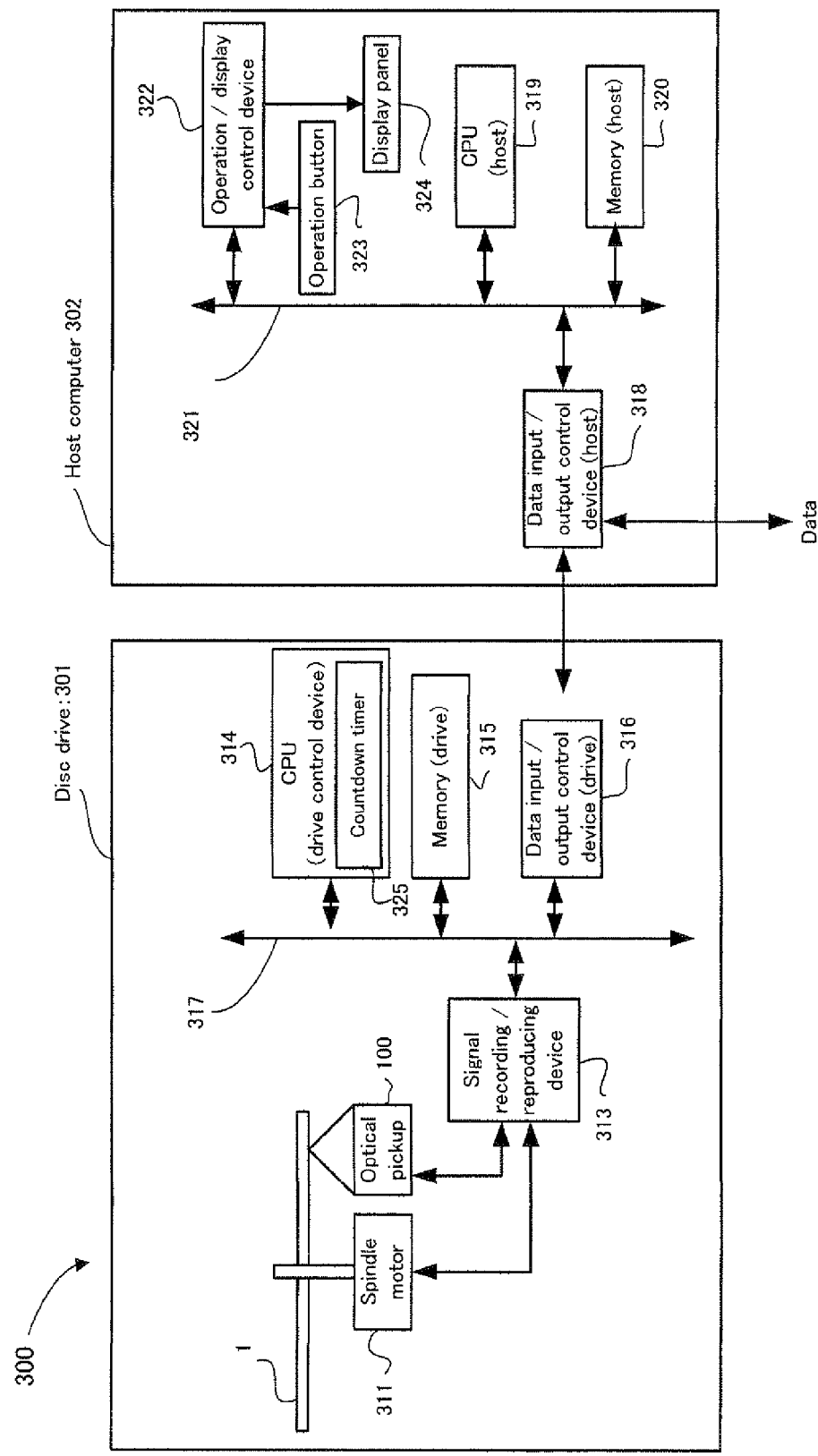

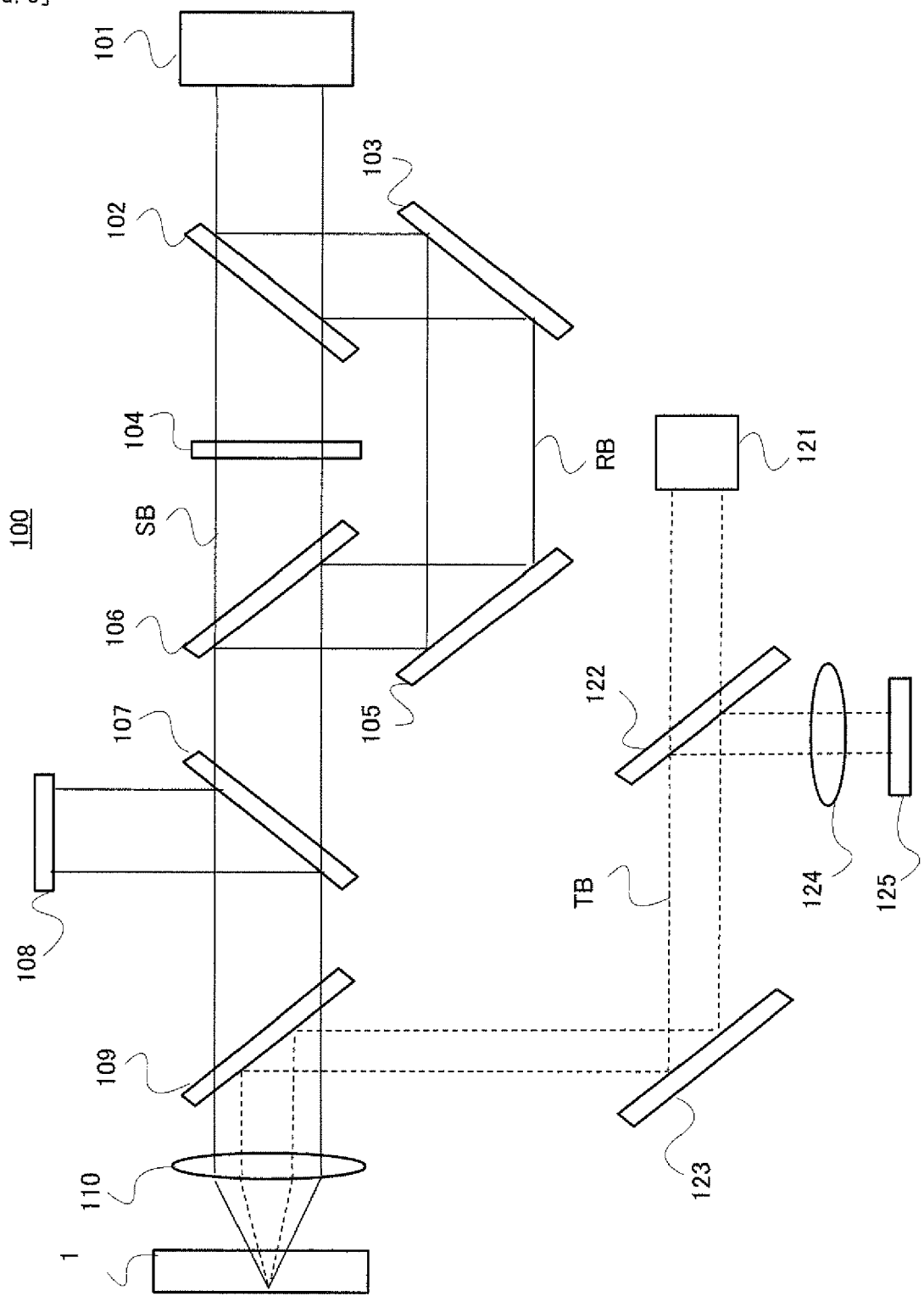

[FIG. 4]
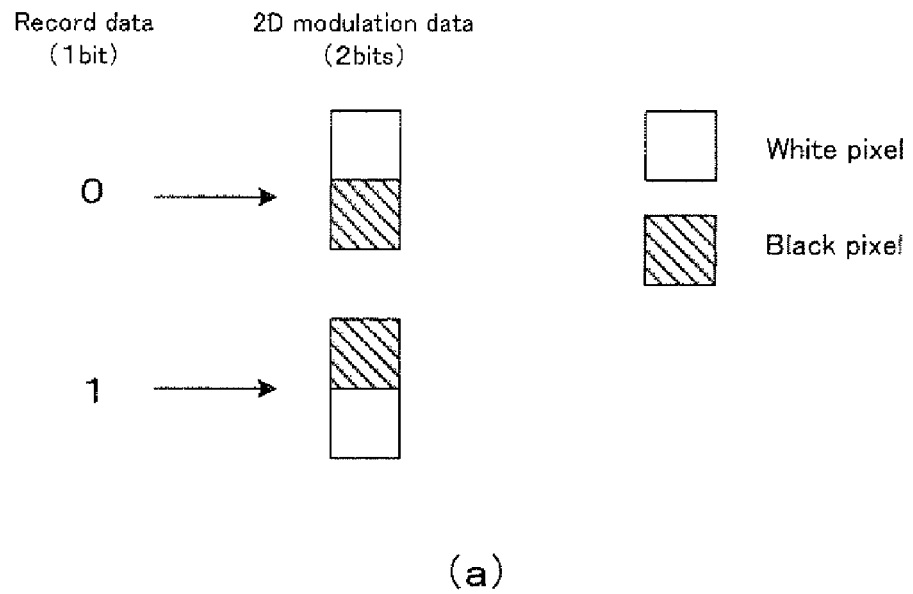
(a)
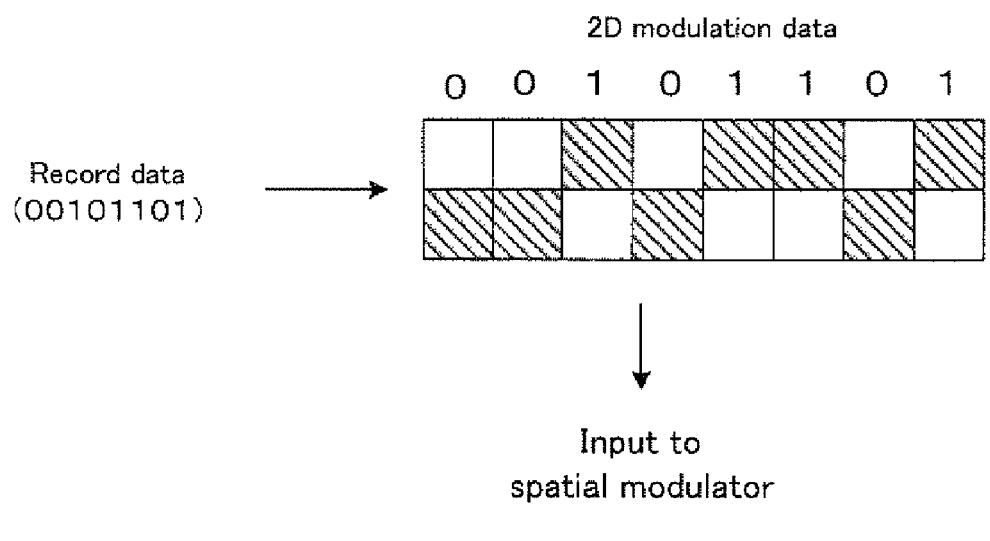
(b)

[FIG. 5]
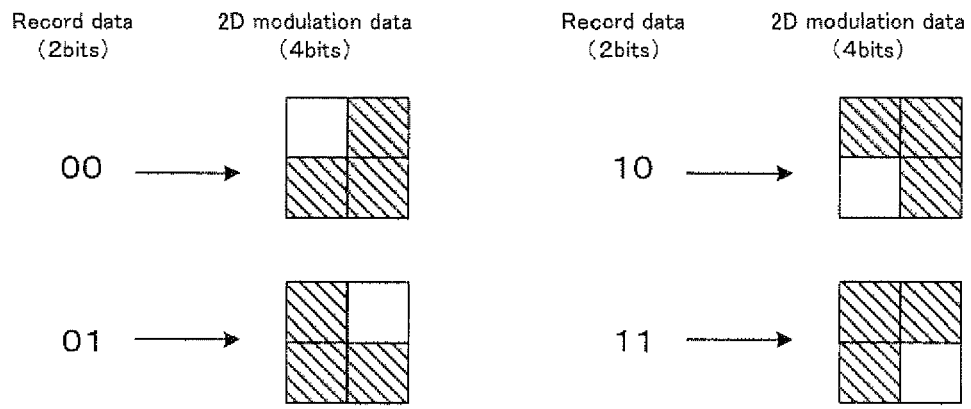
(a)
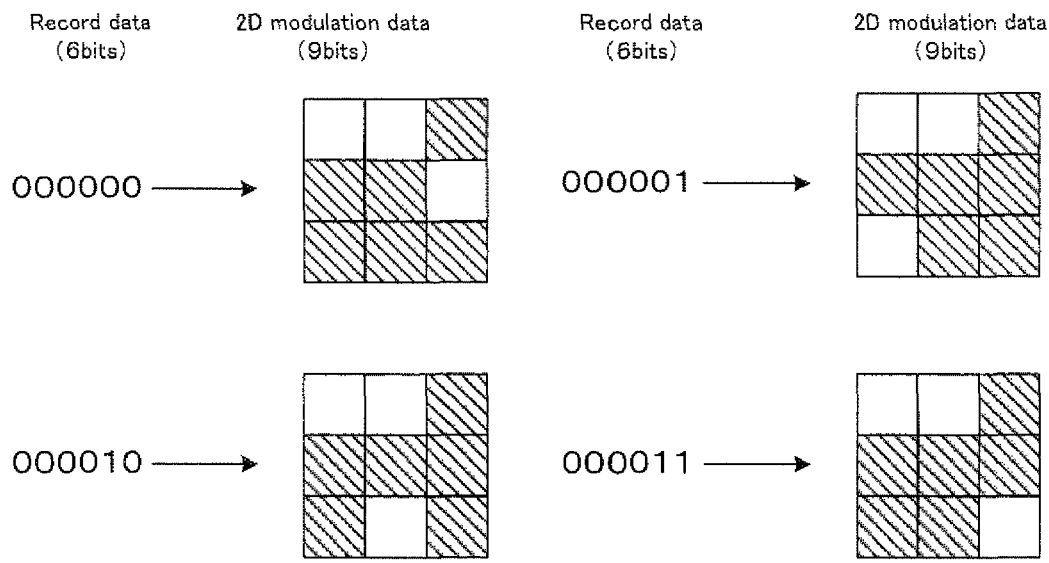
(b)

[FIG. 6]
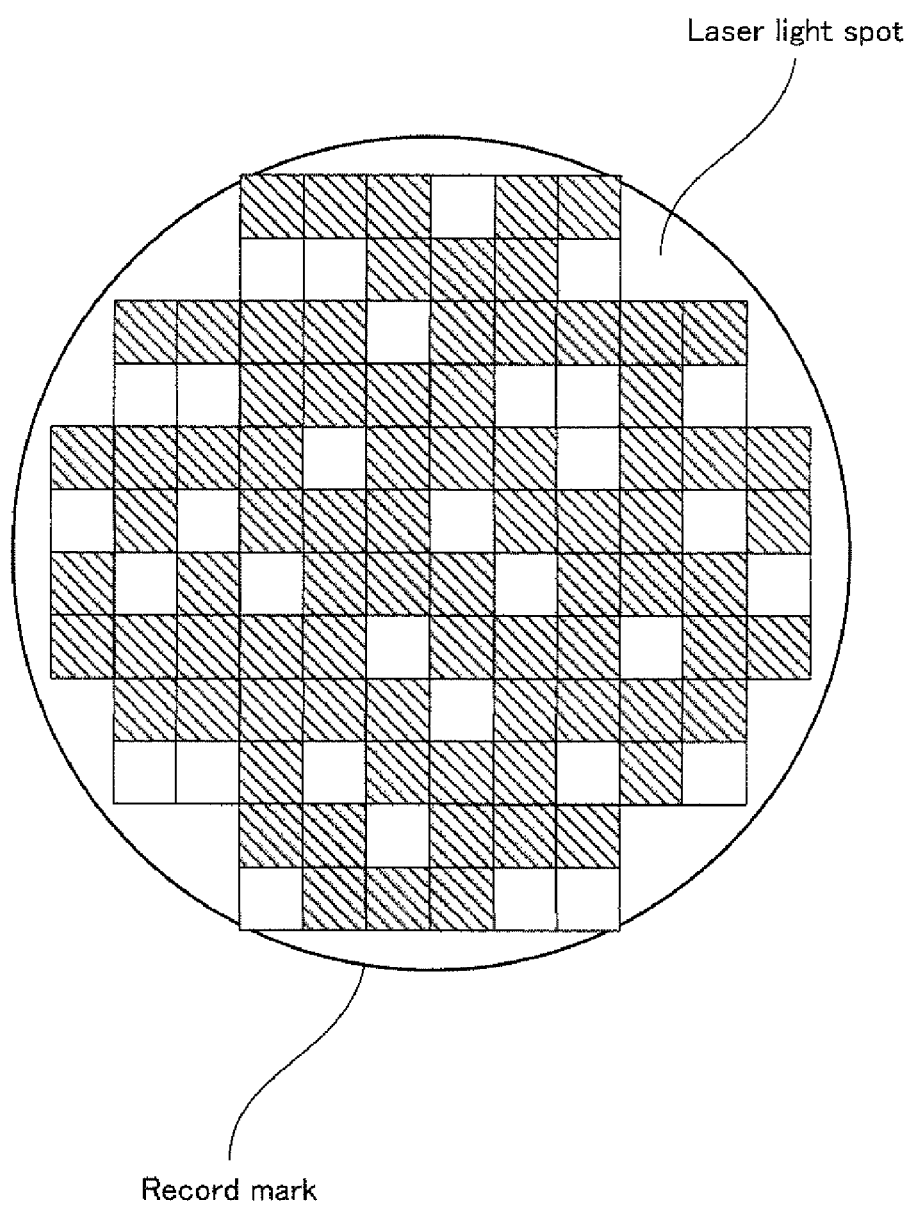

[FIG. 7]
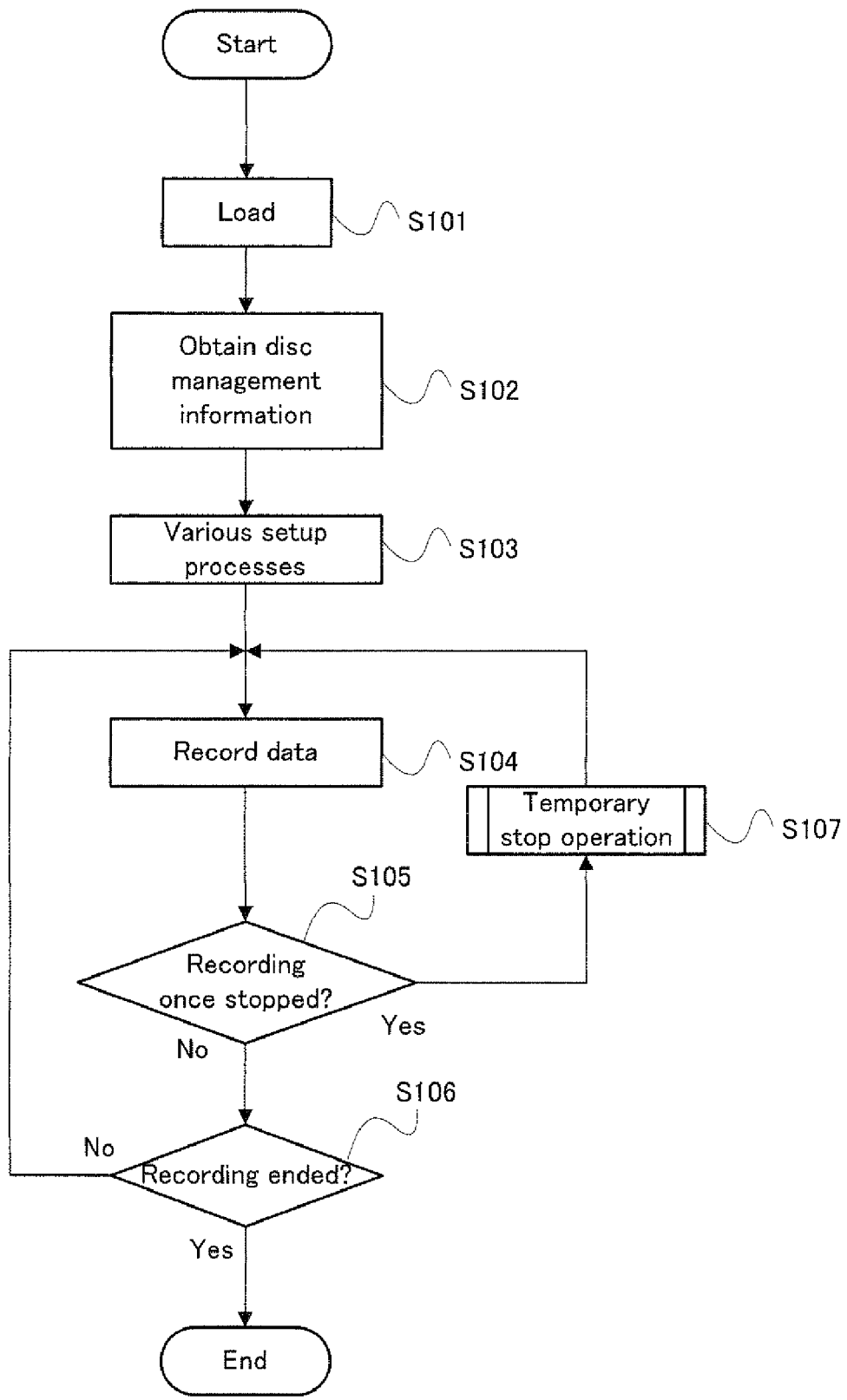

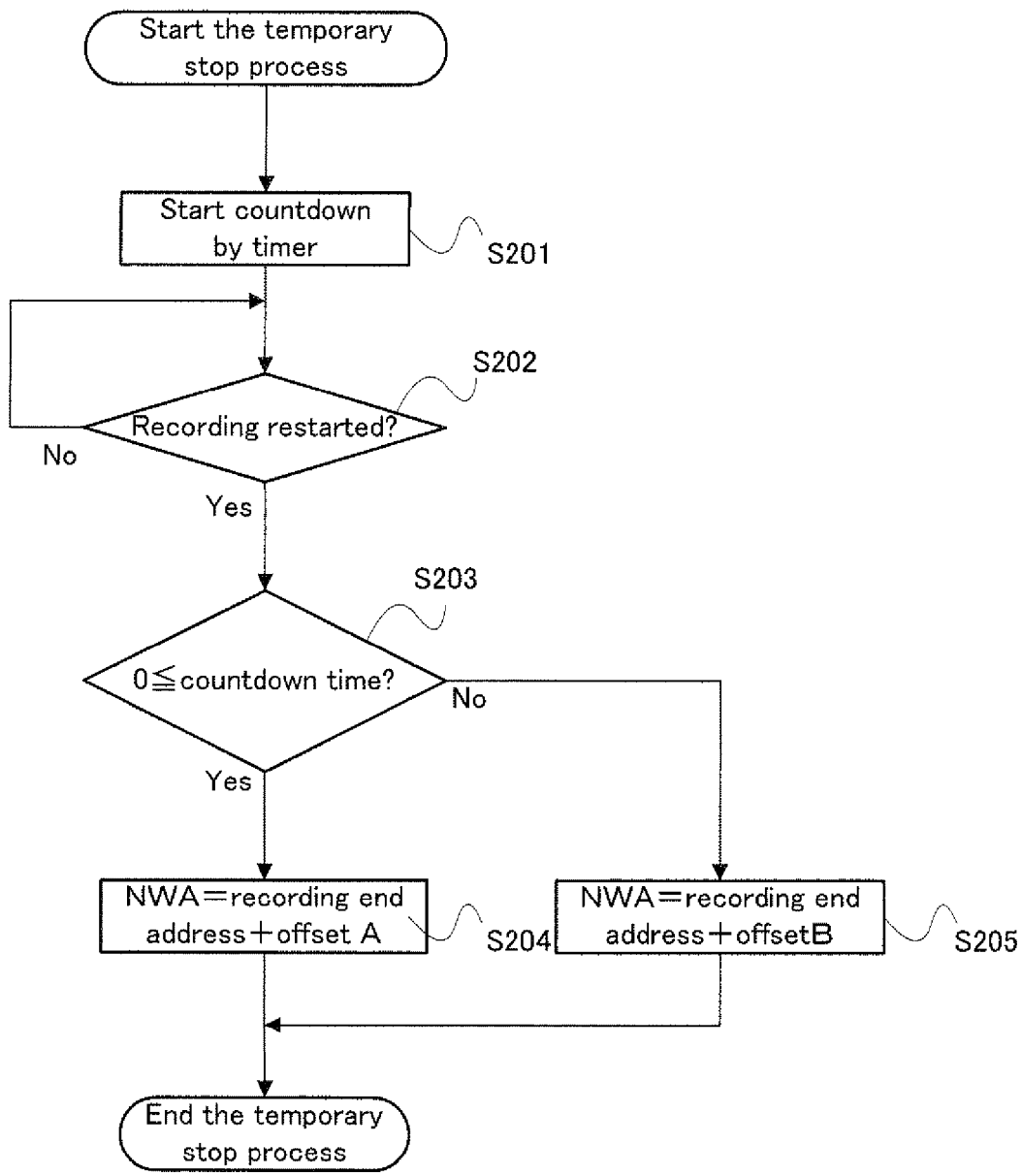
[FIG. 8]

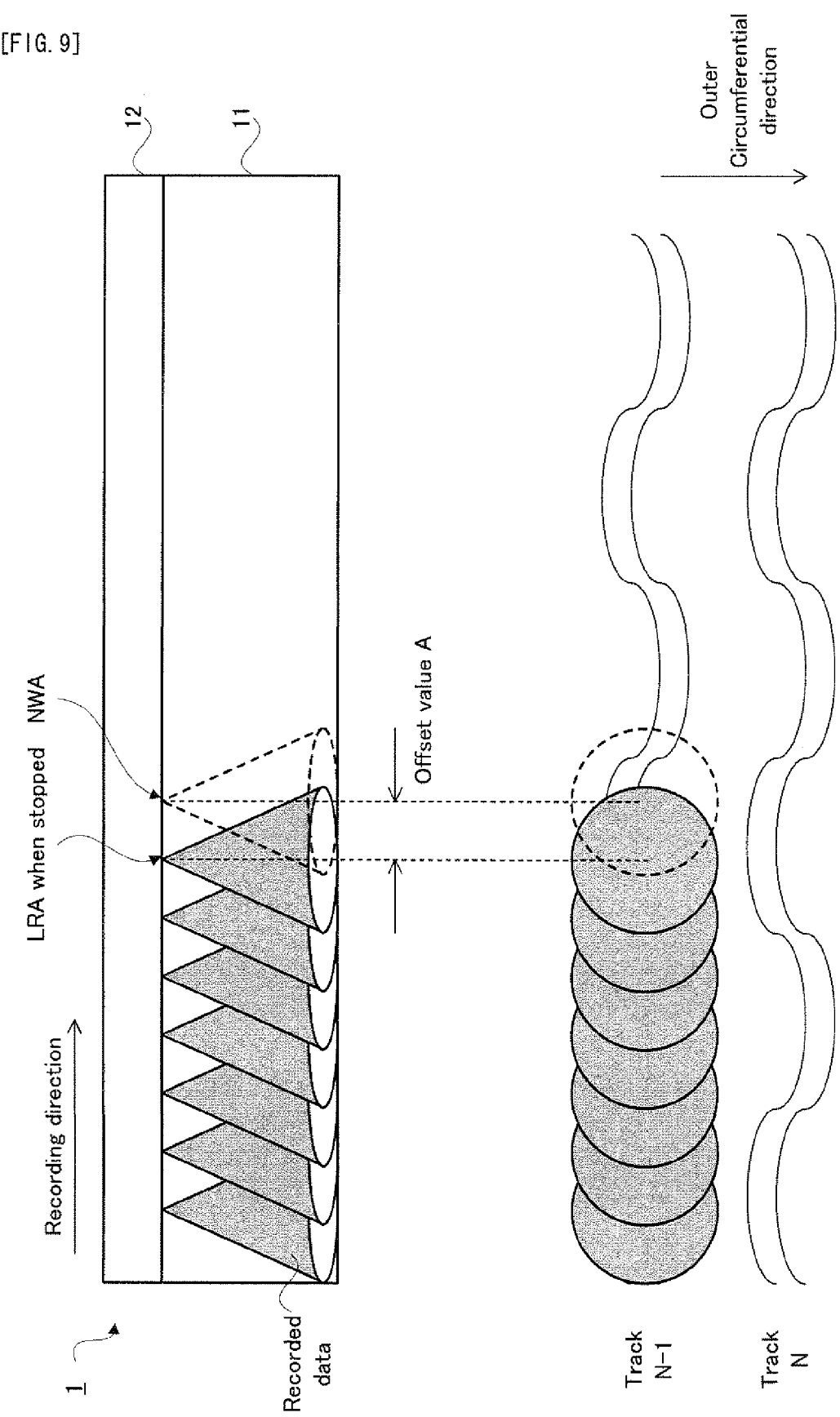
[FIG. 9]

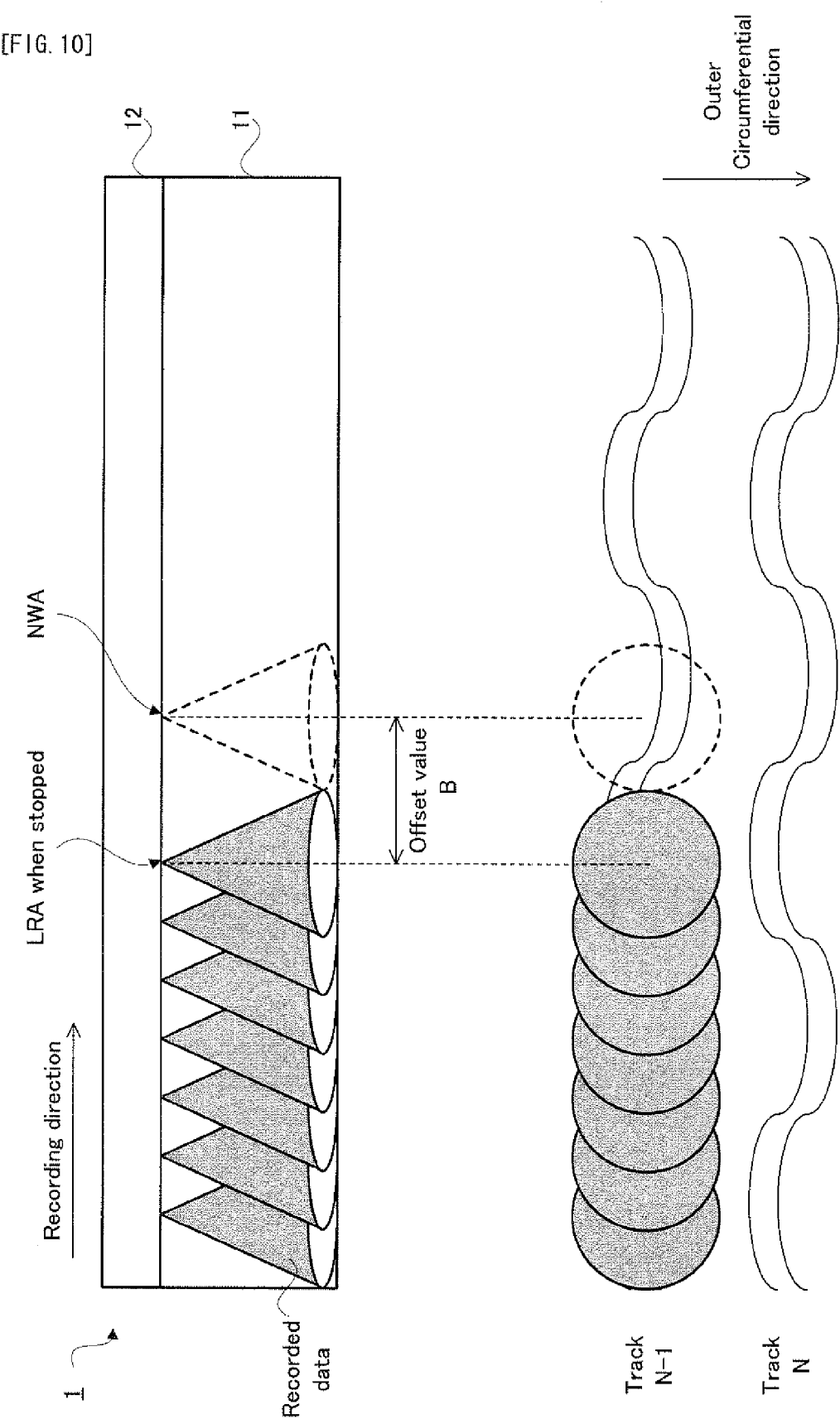

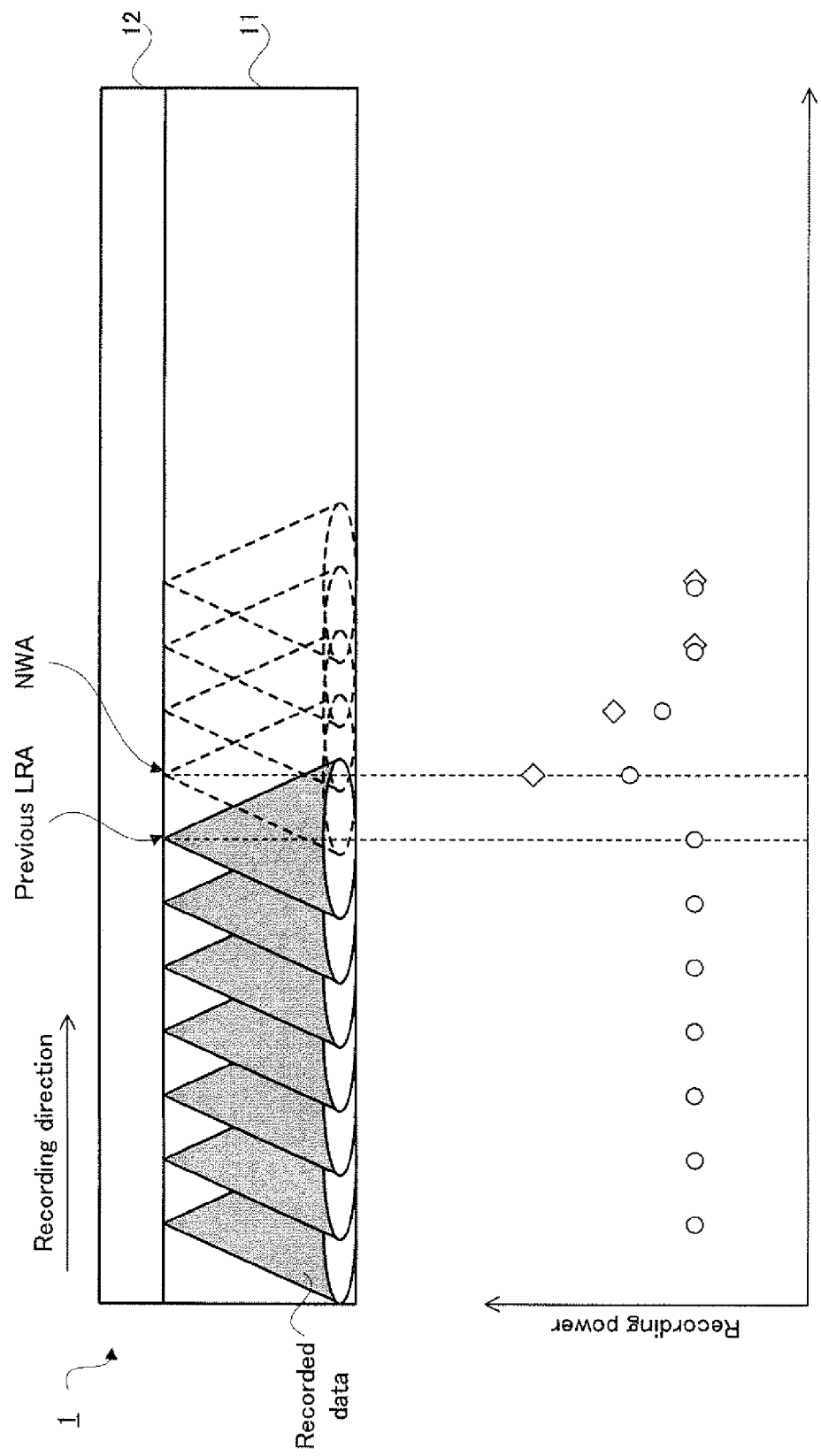
[FIG. 11]

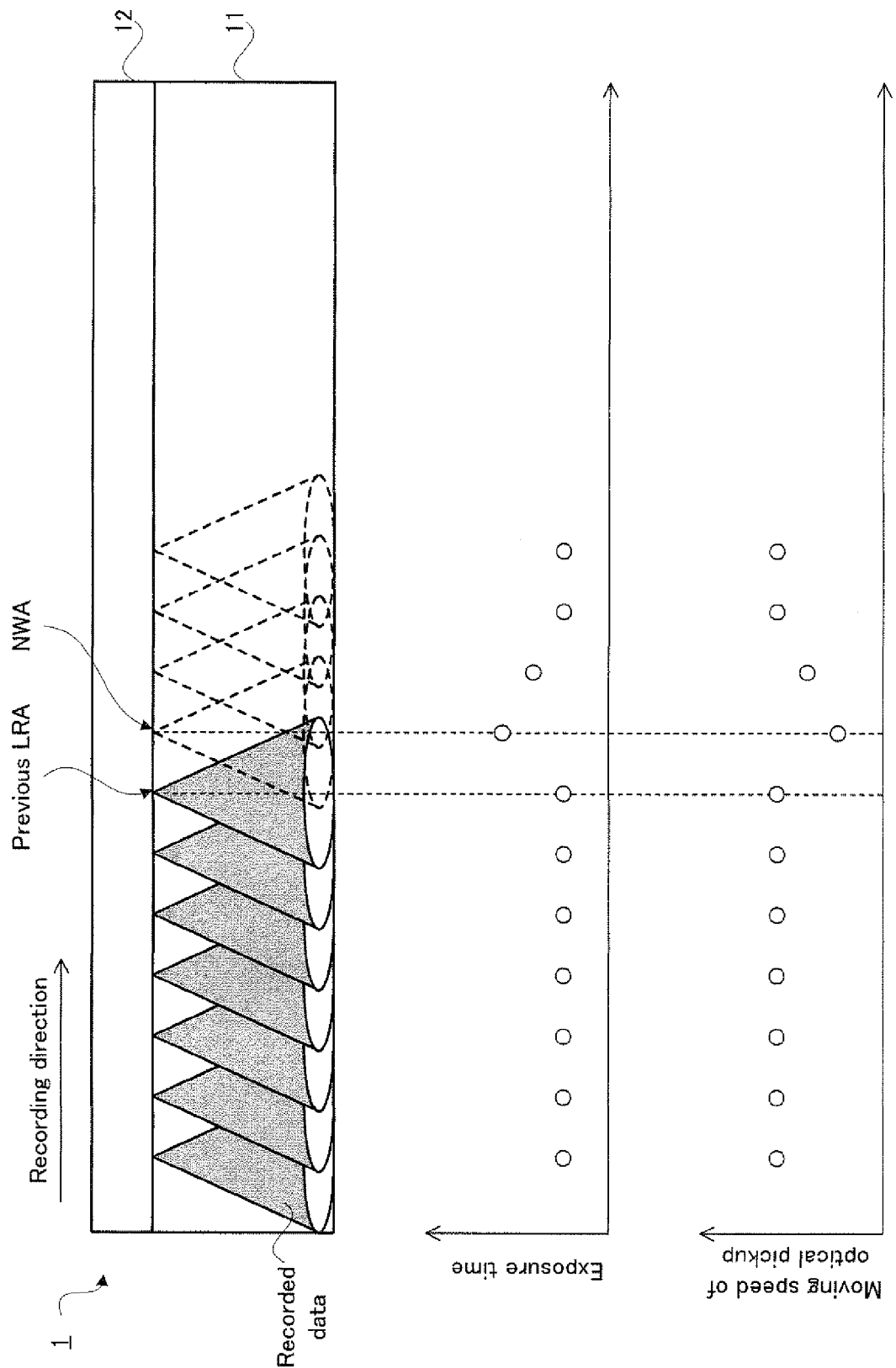
[FIG. 12]

HOLOGRAM RECORDING MEDIUM, HOLOGRAM RECORDING APPARATUS AND METHOD, AND COMPUTER PROGRAM

This application is the U.S. national phase of International Application No. PCT/JP2006/321097, filed 24 Oct. 2006, which designated the U.S. and claims priority to JP 2005-308283, filed 24 Oct. 2005, the entire contents of each of which are hereby incorporated by reference.

TECHNICAL FIELD

The present invention relates to a hologram recording medium, a hologram recording apparatus for and a hologram recording method of recording information into the hologram recording medium, and a computer program used for the hologram recording apparatus.

BACKGROUND ART

There is known a hologram recording technique of recording data to be recorded, as an interference pattern, into a hologram recording medium. In one method, light from a light source is spatially-modulated in accordance with the data to be recorded, by using a modulation pattern obtained by combining two-dimensional white and black patterns which are generated in accordance with a predetermined modulation rule, to thereby generate information light, and the recording medium is irradiated with the signal light and reference light The information light and the reference light form the interference pattern on the recording medium, and the interference pattern is recorded into a recording layer of the recording medium. On the other hand, in reproduction, the interference pattern recorded in the recording medium is irradiated with only the reference light, and detection light from the recording medium is detected by a two-dimensional (2D) sensor, to thereby reproduce the data As in the information recording onto an optical disc or the like, even in the hologram recording, object light and the reference light are focused on the recording medium by using an objective lens or the like. Therefore, in order to accurately perform the information recording and reproduction, addressing control and tracking servo control are required, wherein the addressing control is to preferably recognize a position on the hologram recording medium and the tracking servo control is to control the position of the objective lens with respect to the hologram recording medium. In order to perform the addressing control and the tracking servo control, it is possible to use the hologram recording medium provided with: a hologram recording layer to record therein data; and an address information layer to record therein an address or the like (refer to patent documents 1 and 2). With respect to such a hologram recording medium, it is possible to record the data into the hologram recording medium while preferably performing the addressing control and the tracking servo control or the like, for example, by recording the data into the hologram recording layer with blue laser light and by reading the address or the like recorded in the address information layer with red laser light.

Patent document 1: Japanese Patent Application Laid Open NO. 2005-196826

Patent document 2: Japanese Patent Application Laid Open NO. 2005-71528

DISCLOSURE OF INVENTION

Subject to be Solved by the Invention

As one of the features of such a hologram recording technology, multiplex-recording (or shift-multiplex-recording) can be listed. The multiplex-recording is a technology for recording the data at a high density on the hologram recording medium by forming one interference pattern, which is to record one data, and another interference pattern, which is to record another data, with them superimposed on the hologram recording medium. This is a recording method that is possible because the recording layer or recording film of the hologram recording medium uses, for example, photopolymer or the like which is photo-polymerizable resin (hereinafter collectively referred to as "photopolymer"). The photopolymer has such a characteristic that constituent molecules with different refractive indexes in the photopolymer are polymerized and diffused by the irradiation of light, resulting in hardening after a certain time. Thus, the data can be multiplex-recorded before the photopolymer hardens, and as a result, the data can be recorded at a high density on the hologram recording medium.

On the other hand, it is assumed, even in the hologram recording medium, that sequential recording is performed, as in an optical disc such as a DVD, in order to efficiently use its recording capacity. In performing the sequential recording, an operation of restarting the recording (i.e. write-once or additional recording operation) is frequently performed after the recording is once stopped. Therefore, in restarting the recording, depending on a time elapsed after the stop of the recording, it is avoided to multiplex-record the data in a recording boundary portion because the photopolymer hardens. However, the hardening of the photopolymer requires a certain amount of time, so that not multiplex-recording the data in the recording boundary portion all the time (i.e. non-multiplexed recording) raises a technical problem of reducing the recording capacity of the hologram recording medium.

With regard to the subject to be solved by the present invention, the above can be listed as one example. It is therefore an object of the present invention to provide a hologram recording medium, a hologram recording apparatus and method, which allow the data recording while effectively using the recording capacity, and a computer program which makes a computer as such a hologram recording apparatus.

Means for Solving the Subject (Hologram Recording Medium)

The above object of the present invention can be achieved by a hologram recording medium provided with: a record information area in which record information is recorded; and a time information area to record therein time information which indicates a time length in which the record information can be multiplex-recorded.

According to the hologram recording medium of the present invention, the record information including video information, audio information, information for PC or the like can be recorded into the record information area. More specifically, by modulating the record information in accordance with a modulation rule related to the hologram recording/reproduction, a modulation pattern is generated from the record information. The modulation pattern is used in spatial-modulating the laser light emitted from an optical pickup or the like. The spatial-modulated laser light (i.e. information light or signal light) interferences with reference light of the laser light emitted from the optical pickup. Thereby, an interference pattern is recorded into the hologram recording medium. By this, the record information can be recorded into the record information area.

In particular, the hologram recording medium in the present invention is provided with the time information area to record therein the time information which indicates the time length in which the record information can be multiplex-recorded. More specifically, it is provided with the time information area to record therein the time information which indicates the time length (e.g. a time range, a time upper limit, or the like) in which the interference pattern can be superimposed and recorded by multiplex-recording (or shift-multiplex-recording), which is one feature of the hologram recording technology. Here, the time information may be information which directly or indirectly indicates the time length in which the record information can be multiplex-recorded.

As described above, because the time information which indicates the time length in which the record information can be multiplex-recorded is recorded, if the additional recording operation, which is frequently performed in the sequential recording, is performed, the additional recording operation can be performed with the multiplex-recording of the record information, depending on the time length between the temporary stop of the recording of the record information and the restarting of the recording. Specifically, if the time length between the temporary stop of the recording of the record information and the restarting of the recording is shorter than the time length indicated by the time information, the multiplex-recording of the record information can be performed in a additional recording boundary portion at which the additional recording operation is started. On the other hand, if the time length between the temporary stop of the recording of the record information and the restarting of the recording is longer than the time length indicated by the time information, the non-multiplex-recording of the record information can be performed (i.e. the record information cannot be multiplex-recorded) in the additional recording boundary portion at which the additional recording operation is started. By this, it is not necessary to always perform the non-multiplex-recording of the record information in the additional recording boundary portion, so that it is possible to record the record information while effectively using the recording capacity of the hologram recording medium.

In one aspect of the hologram recording medium of the present invention, the time information indicates a hardening time required to harden a material that constitutes the hologram recording medium after irradiation of a light beam, as the time length in which the record information can be multiplex-recorded.

According to this aspect, if the time length between the temporary stop of the recording of the record information and the restarting of the recording is shorter than the hardening time indicated by the time information, the multiplex-recording of the record information can be performed in the additional recording boundary portion at which the additional recording operation is started. On the other hand, if the time length between the temporary stop of the recording of the record information and the restarting of the recording is longer than the hardening time indicated by the time information, the non-multiplex-recording of the record information can be performed in the additional recording boundary portion at which the additional recording operation is started. The reason why the multiplex-recording can be performed on the hologram recording medium is that a recording layer or recording film of the hologram recording medium uses photopolymer or the like which is photo-polymerizable resin and which has a characteristic of hardening after a certain time from the irradiation of light. Therefore, with referent to the hardening time indicated by the time information, it can be judged relatively easily whether or not the photopolymer or the like has already hardened between the temporary stop of the recording of the record information and the restarting of the recording. By this, it is not necessary to always perform the non-multiplex-recording of the record information in the additional recording boundary portion, so that it is possible to record the record information while effectively using the recording capacity of the hologram recording medium. Incidentally, the recording layer or recording film of the hologram recording medium is not limited to the photopolymer or the like which is photo-polymerizable resin and which has a characteristic of hardening after a certain time from the irradiation of light. It is obvious that various materials that allow the hologram recording can be used.

Moreover, the hardening time indicated by the time information may be information which directly indicates the hardening time required to harden the material that constitutes the hologram recording medium (in particular, its recording layer or recording film) after the irradiation of the light beam. The hardening time indicated by the time information may be information which indirectly indicates the hardening time required to harden the material that constitutes the hologram recording medium (in particular, its recording layer or recording film) after the irradiation of the light beam (Hologram Recording Apparatus)

The above object of the present invention can be also achieved by a hologram recording apparatus provided with: a recording device for recording record information into a hologram recording medium; a measuring device for measuring a time elapsed from the interruption of the recording of the record information to the restart of the recording of the record information; a first controlling device for controlling the recording device to restart the recording of the record information while the record information is multiplex-recorded, if the measured elapsed time is shorter than a time length in which the record information can be multiplex-recorded; and a second controlling device for controlling the recording device to restart the recording of the record information while the record information is not multiplex-recorded, if the measured elapsed time is longer than the time length in which the record information can be multiplex-recorded.

According to the hologram recording apparatus of the present invention, by the operation of the recording device, the record information including video information, audio information, information for PC, or the like can be recorded into the hologram recording layer on the hologram recording medium. More specifically, by modulating the record information in accordance with a modulation rule related to the hologram recording/reproduction, a modulation pattern is generated from the record information. The modulation pattern is used in spatial-modulating the laser light emitted from an optical pickup or the like, which constitutes one specific example of the first recording device. The spatial-modulated laser light (i.e. information light or signal light) interferences with reference light of the laser light emitted from the optical pickup. Thereby, an interference pattern is recorded into the hologram recording medium. By this, the record information can be recorded into the hologram recording medium.

In particular, in the present invention, by the operation of the measuring device, the elapsed time between the temporary stop of the recording of the record information and the restarting of the recording (in other words, the elapsed time between the temporary stop of the recording of the record information and the start of the additional recording operation) is measured. After that, if the measured elapsed time is shorter than the time length in which the record information can be multiplex-recorded, the recording device is controlled by the operation of the first controlling device to perform the multiplex-recording of the record information in the additional recording boundary portion at which the additional recording operation is started. On the other hand, if the measured elapsed time is longer than the time length in which the record information can be multiplex-recorded, the recording device is controlled by the operation of the second controlling device to perform the non-multiplex-recording of the record information in the additional recording boundary portion at which the additional recording operation is started. By this, it is not necessary to always perform the non-multiplex-recording of the record information in the additional recording boundary portion, depending on the time length between the temporary stop of the recording of the record information and the restarting of the recording. Thus, it is possible to record the record information while effectively using the recording capacity of the hologram recording medium. In particular, when the sequential recording is performed, it is predicted that the additional recording operation is frequently performed. Thus, according to the hologram recording apparatus of the present invention, it is possible to record the data while extremely effectively using the recording capacity of the hologram recording medium even if the sequential recording is performed.

In one aspect of the hologram recording apparatus of the present invention, the time length in which the record information can be multiplex-recorded is a hardening time required to harden a material that constitutes the hologram recording medium after irradiation of a light beam.

According to this aspect, if the time length between the temporary stop of the recording of the record information and the restarting of the recording is shorter than the hardening time indicated by the time information, the multiplex-recording of the record information can be performed in the additional recording boundary portion at which the additional recording operation is started. On the other hand, if the time length between the temporary stop of the recording of the record information TO and the restarting of the recording is longer than the hardening time indicated by the time information, the non-multiplex-recording of the record information can be performed in the additional recording boundary portion at which the additional recording operation is started. By this, it is not necessary to always perform the non-multiplex-recording of the record information in the additional recording boundary portion, so that it is possible to record the record information while effectively using the recording capacity of the hologram recording medium.

In another aspect of the hologram recording apparatus of the present invention, the first controlling device controls the recording device to record the record information from a position shifted by a first offset amount from a position of a record mark formed by recording the record information before the stop.

According to this aspect, by the operation of the first controlling device, it is possible to record the record information such that the record mark after the restarting of the recording is formed at the position shifted by the predetermined first offset amount from the position of the record mark formed by recording the record information before the stop. By this, it is possible to preferably perform the multiplex-recording of the record information.

In an aspect of the hologram recording apparatus in which the record information is recorded from the position shifted by the first offset amount, as described above, the first offset amount may be a shift amount in the multiplex-recording.

By virtue of such construction, it is possible to preferably perform the multiplex-recording of the record information, by the operation of the first controlling device.

In another aspect of the hologram recording apparatus of the present invention, the second controlling device controls the recording device to record the record information from a position shifted by a second offset amount from a position of a record mark formed by recording the record information before the stop.

According to this aspect, by the operation of the second controlling device, it is possible to record the record information such that the record mark after the restarting of the recording is formed at the position shifted by the predetermined second offset amount, which is different from the aforementioned first offset amount, from the position of the record mark formed by recording the record information before the stop. By this, it is possible to preferably perform the non-multiplex-recording of the record information.

In an aspect of the hologram recording apparatus in which the record information is recorded from the position shifted by the second offset amount, as described above, the second offset amount may be greater than or equal to a size of a diameter of the record mark.

By virtue of such construction, it is possible to preferably perform the non-multiplex-recording of the record information, by the operation of the second controlling device.

In an aspect of the hologram recording apparatus in which the record information is recorded from the position shifted by the second offset amount, as described above, the second offset amount may have an extent that is required to make the record mark formed by recording the record information before the stop not overlap the record mark of the record information recorded after the restarting of the recording.

By virtue of such construction, it is possible to preferably perform the non-multiplex-recording of the record information, by the operation of the second controlling device.

In another aspect of the hologram recording apparatus of the present invention, it is further provided with a storing device for storing time information which indicates the time length in which the record information can be multiplex-recorded.

According to this aspect, it is possible to preferably perform the aforementioned operations with reference to the time information stored in the storing device.

In another aspect of the hologram recording apparatus of the present invention, time information is recorded on the hologram recording medium, the time information indicating the time length in which the record information can be multiplex-recorded.

According to this aspect, it is possible to preferably perform the aforementioned operations with reference to the time information recorded on the hologram recording medium.

In another aspect of the hologram recording apparatus of the present invention, it is further provided with a third controlling device for controlling a recording power which is used when the recording device multiplex-records the record information, in accordance with the measured elapsed time, if the measured elapsed time is shorter than the time length in which the record information can be multiplex-recorded.

According to this aspect, by the operation of the third controlling device, the recording power (e.g. the value of the recording power) when the recording device multiplex-records the record information is controlled in accordance with how long the measured elapsed time is. More specifically explaining this, even if the elapsed time is shorter than the time length in which the multiplex-recording can be performed (in other words, the hardening time), the longer the elapsed time is, the more the photopolymer or the like that constitutes the hologram recording layer hardens. If the hardening of the photopolymer or the like progresses, recording features in recording the record information are different.

Thus, with the same recording power, it is hard to maintain the good recording quality of the record information. Therefore, controlling the recording power by the operation of the third controlling device allows the good recording quality of the record information to be maintained.

Incidentally, when the non-multiplex-recording of the record information, the record information is recorded but not superimposed on the recording layer or recording film in which the hardening progresses due to the recording of the record information before the recording of the record information is restarted (i.e. before the recording of the record information is once stopped). Thus, it is not always necessary to consider the control of the recording power by the third controlling device. However, the recording power may be controlled even in the non-multiplex-recording of the record information.

In an aspect of the hologram recording apparatus provided with the third controlling device, as described above, the third controlling device may increase the recording power as the measured elapsed time is relatively long. That is, the third controlling device may increase the recording power more as the measured elapsed time becomes longer.

By virtue of such construction, it is possible to maintain the good recording quality of the record information. More specifically explaining this, if the hardening of the photopolymer or the like progresses, the sensitivity of the recording layer or recording film of the hologram recording medium decreases. Thus, in order to maintain the good recording quality of the record information that is recorded into the recording layer or recording film with the sensitivity reduced, it is necessary to relatively increase the recording power. Therefore, increasing the recording power by the operation of the third controlling device allows the good recording quality of the record information to be maintained.

Incidentally, the increasing amount of the recording power is preferably determined in accordance with the extent that the light beam or the like irradiated to newly record the record information overlaps the recording layer or recording film in which the hardening progresses due to the recording of the record information before the recording of the record information is restarted.

In an aspect of the hologram recording apparatus provided with the third controlling device, as described above, the third controlling device may increase the recording power, and then reduces the recording power step by step by a predetermined amount or continuously by a predetermined ratio.

By virtue of such construction, as the recording operation progresses, the record information is recorded but not superimposed on the recording layer or recording film in which the hardening progresses due to the recording of the record information before the recording of the record information is restarted. Thus, it is possible to reset the recording power to the original recording power by reducing the recording power gradually or step by step.

In another aspect of the hologram recording apparatus of the present invention, the recording device records the record information by irradiating a light beam, and the hologram recording apparatus further comprises a fourth controlling device for controlling an irradiation time of the light beam required to record the record information, in accordance with the measured elapsed time, if the measured elapsed time is shorter than the time length in which the record information can be multiplexed and recorded.

According to this aspect, it is possible to receive the same benefits as those in increasing the recording power by the operation of the aforementioned third controlling device. That is, increasing the recording power and increasing the irradiation time are common in the point of increasing the amount of energy given to the recording layer or recording film of the hologram recording medium. In the same manner, reducing the recording power and reducing the irradiation time are common in the point of reducing the amount of energy given to the recording layer or recording film of the hologram recording medium. Therefore, it is possible to maintain the good recording quality of the record information by controlling the irradiation time of the light beam (e.g. controlling a moving speed of an optical pickup) by the operation of the fourth controlling device, in addition to or instead of controlling the recording power by the operation of the third controlling device.

In an aspect of the hologram recording apparatus provided with the fourth controlling device, as described above, the fourth controlling device may increase the irradiation time as the measured elapsed time is relatively long.

By virtue of such construction, it is possible to maintain the good recording quality of the record information, as in increasing the recording power by the operation of the third controlling device.

In an aspect of the hologram recording apparatus provided with the fourth controlling device, as described above, the fourth controlling device may increase the irradiation time, and then reduces the irradiation time step by step by a predetermined amount or continuously by a predetermined ratio.

By virtue of such construction, it is possible to reset the irradiation time of the light beam to the original irradiation time, as in reducing the recording power gradually or step by step by the operation of the third controlling device. That is, it is possible to reset the extent of the energy given to the recording layer or recording film of the hologram recording medium, to the original extent.

(Hologram Recording Method)

The above object of the present invention can be also achieved by a hologram recording method in a hologram recording apparatus provided with: a recording device for recording record information into a hologram recording medium, the hologram recording method provided with: a measuring process of measuring a time elapsed from the interruption of the recording of the record information to the restart of the recording of the record information; a first controlling process of controlling the recording device to restart the recording of the record information while the record information is multiplex-recorded, if the measured elapsed time is shorter than a time length in which the record information can be multiplex-recorded; and a second controlling process of controlling the recording device to restart the recording of the record information while the record information is not multiplex-recorded, if the measured elapsed time is longer than the time length in which the record information can be multiplex-recorded.

According to the hologram recording method of the present invention, it is possible to receive the same various benefits as those of the hologram recording apparatus of the present invention described above.

Incidentally, in response to various aspects as those of the hologram recording apparatus of the present invention, the hologram recording method of the present invention can also employ various aspects.

(Computer Program)

The above object of the present invention can be also achieved by a computer program for hologram recording control to control a computer provided in the aforementioned hologram recording apparatus of the present invention (including its various aspects), the computer program making the computer function as at least one portion of the measuring device, the first controlling device, and the second controlling device.

According to the computer program of the present invention, the aforementioned hologram recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects of the aforementioned hologram recording apparatus of the present invention, the computer program of the present invention can also employ various aspects.

The above object of the present invention can be also achieved by a computer program product in a computer-readable medium for tangibly embodying a program of instructions executable by a computer provided in the aforementioned hologram recording apparatus of the present invention (including its various aspects), the computer program product making the computer function as at least one portion of the measuring device, the first controlling device, and the second controlling device.

According to the computer program product of the present invention, the aforementioned hologram recording apparatus of the present invention can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, into the computer via a communication device. More specifically, the computer program product may include computer readable codes to cause the computer (or may comprise computer readable instructions for causing the computer) to function as the aforementioned hologram recording apparatus of the present invention.

These effects and other advantages of the present invention will become more apparent from the embodiments explained below.

As explained above, according to the hologram recording medium of the present invention, it is provided with the record information area and the time information area. According to the hologram recording apparatus, it is provided with the recording device, the measuring device, the first controlling device, and the second controlling device. According to the hologram recording method, it is provided with the measuring process, the first controlling process and the second controlling process. According to the computer program of the present invention, it makes a computer function as at least one portion of the measuring device, the first controlling device, and the second controlling device. Therefore, it is possible to record the record information while effectively using the recording capacity of the hologram recording medium.

BRIEF DESCRIPTION OF DRAWINGS

FIG. 1 are a cross sectional view and a plan view conceptually showing the basic structure of a hologram recording medium in an embodiment.

FIG. 2 is a block diagram conceptually showing the basic structure of a hologram recording/reproducing apparatus in an embodiment.

FIG. 3 is a block diagram conceptually showing, in particular, the basic structure of an optical system disposed in an optical pickup in the hologram recording/reproducing apparatus in the embodiment.

FIG. 4 are schematic diagrams showing one specific example of a 2-dimensional digital modulation method for data.

FIG. 5 are schematic diagrams showing another specific example of the 2-dimensional digital modulation method for data.

FIG. 6 is a plan view conceptually showing an aspect of data recording on a hologram recording layer of the hologram recording medium.

FIG. 7 is a flowchart conceptually showing a flow of a data recording operation by the hologram recording/reproducing apparatus in the embodiment.

FIG. 8 is a flowchart conceptually showing a flow of a temporary stop operation in a step S107 in FIG. 7.

FIG. 9 is a cross sectional view and a plan view conceptually showing a recording state of the hologram recording medium when additional data recording operation is performed if it is judged that a current count value by a countdown timer is greater than or equal to 0.

FIG. 10 is a cross sectional view and a plan view conceptually showing a recording state of the hologram recording medium when additional data recording operation is performed if it is judged that a current count value by a countdown timer is not greater than or equal to 0.

FIG. 11 is a cross sectional view and a graph conceptually showing a relationship between an aspect of the data recording into the hologram recording medium and a recording power, in a modified operation example.

FIG. 12 is a cross sectional view and a graph conceptually showing a relationship among an aspect of the data recording into the hologram recording medium, an exposure time, and a optical pickup moving speed, in the modified operation example.

DESCRIPTION OF REFERENCE CODES

1 hologram recording medium
11 hologram recording layer
12 address information layer
21 user data area
22 management information area
23 hardening time information
100 pickup
101 recording/reproduction laser
104 spatial modulator
108 2D sensor
300 hologram recording/reproducing apparatus
313 signal recording/reproducing device
314, 319 CPU
325 countdown timer

BEST MODE FOR CARRYING OUT THE INVENTION

Hereinafter, the best mode for carrying out the present invention will be explained in order in each embodiment with reference to the drawings.

(1) Hologram Recording Medium

Firstly, with reference to FIG. 1 the basic structure of a hologram recording medium in an embodiment of the present invention will be explained. FIG. 1 are a cross sectional view and a plan view conceptually showing the basic structure of the hologram recording medium in the embodiment.

As shown in each of FIG. 1(a) and FIG. 1(b), a hologram recording medium 1 is provided with: a hologram recording layer 11; and an address information layer 12.

The hologram recording layer 11 is provided with: a user data area 21, which constitutes one specific example of the "record information area" of the present invention; and a management information area 22, which constitutes one specific example of the "time information area" of the present invention.

The user data area 21 is a layer to record therein video data, audio data, and other various data.

In the management information area 22, various management information is recorded to manage or control the recording and reproduction of the data recorded in the user data area 21. The management information includes hardening time information 23, which constitutes one specific example of the "time information" of the present invention.

The hardening time information 23 indicates a time length required to harden a material that constitutes the hologram recording layer 11 (e.g. photopolymer or the like which is photo-polymerizable resin) after the material is irradiated with laser light. Incidentally, the time length required to harden the material varies depending on the material's environment (e.g. temperature or the like). Thus, the hardening time information 23 may indicate a time length required to harden the material under a predetermined temperature environment (e.g. 25 degree Celsius). In this case, the time length required for the hardening under the actual environment in which the hologram recording medium 1 is used may be calculated by a calculation or the like from the time length required to harden the material under the predetermined temperature environment, in view of the actual environment. In this case, various parameters required for the calculation may be recorded as the management information.

Alternatively, correlation information (e.g. a graph, a function, a table, or the like) which indicates a correlation between the environment of the hologram recording medium 1 and the hardening time may be recorded as the hardening time information 23.

The hardening time information 23 indicates a time length in which the data can be multiplex-recorded in the user data area 21 under the condition that the data recording is restarted (i.e. a write-once operation or additional recording operation is performed) after it is once stopped. That is, if the data recording is restarted within the time that is indicated by the hardening time information 23 after the data recording is once stopped, the data can be superimposed and recorded on the data recorded when the data recording is once stopped (i.e. multiplexed recording is performed). On the other hand, if the data recording is restarted over the time that is indicated by the hardening time information 23 after the data recording is once stopped, the data is recorded but not superimposed on the data recorded when the data recording is once stopped (i.e. non-multiplex-recording is performed). Incidentally, an aspect of the data recording using the hardening time information 23 will be detailed later.

Incidentally, the hardening time information 23 may indicate a time that has no adverse effect on the multiplex-recording of the data (or time range and its upper limit), in addition to or instead of indicating the hardening time itself of the material that constitutes the hologram recording layer 11. That is, the hardening time information 23 may indicate a time in which the multiplex-recording of the data can be performed without hindrance (or time range and its upper limit), with a time point at which the data recording is once stopped being a base.

The address information layer 12 is formed by forming a track spirally or concentrically, centered on a center hole 13. The track is wobbled (or oscillated) in predetermined cycles, and address information or the like is recorded by using the wobbling. Alternatively, the address information or the like may be recorded by using pre-pits, such as embossed pits, formed in advance.

(2) Basic Structure of Hologram Recording/Reproducing Apparatus

Next, with reference to FIG. 2, a hologram recording/reproducing apparatus will be explained as an embodiment of the hologram recording apparatus of the present invention. FIG. 2 is a block diagram conceptually showing the basic structure of the hologram recording/reproducing apparatus in the embodiment.

As shown in FIG. 2, a hologram recording/reproducing apparatus 300 is provided with: a disc drive 301 on which the hologram recording medium 1 is actually loaded and on which data recording and data reproduction are performed; and a host computer 302, such as a personal computer, for controlling the data recording and reproduction with respect to the disc drive 301.

The disc drive 301 is provided with: the hologram recording medium 1; a spindle motor 311: an optical pickup 100; a signal recording/reproducing device 313; a CPU (drive control device) 314; a memory 315; a data input/output control device 316; and a bus 317. Moreover, the host computer 302 is provided with: a data input/output control device 318; a CPU 319; a memory 320; a bus 321; an operation/display control device 322; an operation button 323; and a display panel 324.

The spindle motor 311 is intended to rotate and stop the hologram recording medium 1, and operates upon accessing the hologram recording medium 1. More specifically, the spindle motor 311 is constructed to rotate the hologram recording medium 1 at a predetermined speed and stop, under spindle servo from a not-illustrated servo unit or the like.

The optical pickup 100 constitutes one specific example of the "recording device" of the present invention, and is provided with a semiconductor laser device, a lens, and the like, in order to perform the data recording on the hologram recording medium 1. The detailed structure of the optical pickup 100 will be described later (refer to FIG. 3).

The signal recording/reproducing device 313 controls the spindle motor 311 and the optical pickup 312, to thereby perform the data recording into the hologram recording medium 1. More specifically, the signal recording/reproducing device 313 controls a spatial modulator 104 described later, to thereby generate a two-dimensional (2D) modulation image pattern according to the data to be recorded, and displays it on the spatial modulator 104. Moreover, the signal recording/reproducing device 313 performs a demodulation process or the like on a spatial modulation image pattern detected by a 2D sensor 108 described later, to thereby generate reproduction data and reproduces the reproduction data.

The memory 315 is used in the general data processing on the disc drive 301, including a buffer area for the data, an area used as an intermediate buffer when data is converted into the data that can be used on the signal recording/reproducing device 313, and the like. Moreover, the memory 315 is provided with: a ROM area into which a program for performing an operation as a recording device, i.e. firmware, is stored; a buffer for temporary storage of the record/reproduction data; a RAM area into which a parameter required for the operation of a firmware program or the like is stored; and the like.

The CPU (drive control device) 314 is connected to the signal recording/reproducing device 313 and the memory 315 through the bus 317, and controls the entire disc drive 301 by giving an instruction to various controlling devices. Moreover, usually, software or firmware for operating the CPU 314 is stored in the memory 315.

In particular, the CPU 314 is provided with a countdown timer 325, which constitutes one specific example of the "measuring device" of the present invention. The countdown timer 325 starts countdown from a predetermined value with the stop of the data recording as trigger, and performs the countdown until the count value becomes zero.

The data input/output control device 316 controls the input/output of the data from the exterior with respect to the disc drive 301, to thereby is perform import to and export from the data buffer on the memory 315. A drive control command issued from the external host computer 302 connected to the disc drive 301 through an interface, such as a SCSI and an ATAPI, is transmitted to the CPU 314 through the data input/output control device 316. Moreover, the data is also exchanged with the host computer 302 through the data input/output control device 316, in the same manner.

The operation/display control device 322 receives an operation instruction and performs display with respect to the host computer 302, and transmits an instruction by the operation button 323, such as an instruction to record, to the CPU 319. The CPU 319 may transmit a control command to the disc drive 301, through the data input/output control device 318, on the basis of instruction information from the operation/display control device 322, to thereby control the entire disc drive 301. In the same manner, the CPU 319 can transmit a command for requesting the disc drive 301 to transmit an operational state to the host, with respect to the disc drive 301. By this, the operational state of the disc drive 301, such as during recording, can be recognized, so that the CPU 319 can output the operational state of the disc drive 301 to the display panel 301, such as a fluorescent tube and an LCD, through the operation/display control device 322.

The memory 320 is an internal memory apparatus used by the host computer 302, and it is provided with: a ROM area in which a firmware program, such as BIOS (Basic Input/Output System), is stored; a RAM area in which variables necessary for the operation of an operating system and an application program or the like are stored; and the like. Moreover, the memory 320 may be connected to an external memory apparatus, such as a not-illustrated hard disk, through the data input/output control device 318.

One specific example used by combining the disc drive 301 and the host computer 302, as explained above, is household equipment, such as recorder equipment for recording and reproducing video images. The recorder equipment records a video signal from a broadcast reception tuner and an external connection terminal, onto a disc. The operation as the recorder equipment is performed by executing a program stored in the memory 320, on the CPU 319. Moreover, in another specific example, the disc drive 301 is a disc drive (hereinafter referred to as a "drive", as occasion demands), and the host computer 302 is a personal computer or a work station. The host computer, such as the personal computer, and the drive are connected through the data input/output control devices 316 and 318, such as the SCSI and the ATAPI, and application, such as writing software, installed in the host computer 302 controls the disc drive 301.

Next, the basic structure of the optical pickup 100 will be explained with reference to FIG. 3. FIG. 3 is a block diagram conceptually showing, in particular, the basic structure of an optical system disposed in the optical pickup 100 in the hologram recording/reproducing apparatus 300 in the embodiment.

As shown in FIG. 3, the optical pickup 100 is provided with: a recording/reproduction laser 101 which generates laser light for data recording or reproducing; and a servo laser 121 which generates red laser light for tracking servo control.

In the data recording, the laser light Lo emitted from the recording/reproduction laser 101 is divided by a beam splitter 102 into a signal beam SB as objective light and a reference beam RB as reference light for recording. The signal beam SB is inputted to a spatial modulator 104. The spatial modulator 104 can be formed of e.g. a liquid crystal element and has a plurality of pixels arranged in a lattice pattern.

The spatial modulator 104 displays a 2D modulation image pattern, which includes white pixels and black pixels and which is obtained by 2D digital-modulating the user data to be recorded. And the spatial modulator 104 spatially-modulates the signal beam SB by using the 2D modulation image patterns.

The signal beam SB, which is spatially-modulated by the spatial modulator 104, and the reference beam RB, whose optical path is adjusted by mirrors 103 and 105, are merged on the same optical axis by a beam splitter 106, and then is transmitted through a half mirror 107 and a dichroic mirror 109 with wavelength selectivity, is focused by an objective lens 110, and is irradiated onto the hologram recording medium 1. As a result, the spatial-modulated signal beam SB and the reference beam RB form an interference pattern in the hologram recording medium 1 (more specifically, in the hologram recording layer 11), and the interference pattern is recorded into the hologram recording medium 1.

Now, with reference to FIGS. 4 to FIG. 6, an explanation will be given on specific aspects of the 2D digital modulation. FIG. 4 are schematic diagrams showing one specific example of the 2-dimensional digital modulation method for data. FIG. 5 are schematic diagrams showing another specific example of the 2-dimensional digital modulation method for data. FIG. 6 is a plan view conceptually showing an aspect of data recording on the hologram recording layer 11 of the hologram recording medium 1.

As shown in FIG. 4(a), the data to be recorded into the hologram recording medium 1 (hereinafter referred to as "record data" as occasion demands), which are "0" and "1", are expressed by the combination of the white pixel and the black pixel. The vertical arrangement of the white pixel and the black pixel in this order corresponds to the record data "0", and the vertical arrangement of the black pixel and the white pixel in this order corresponds to the record data "1". This example is referred to as 1:2 difference modulation because 1-bit record data is converted to 2-bit (or 2 pixel) 2D modulation data.

FIG. 4(b) shows the 2D modulation data, which is obtained by 2D digital-modulating record data of "00101101" in this modulation method. That is, the 2D modulation data to which marker data, which indicates a reference position of the pixel, is added and is displayed on the spatial modulator 104, as the white pixel and the black pixel. Incidentally, the spatial modulator 104 is driven to generate the white pixel portion and the black pixel portion, under the control of the signal recording/reproducing device 313, and it converts the record data to a 2D modulation image pattern. The laser light which enters the spatial modulator 104 is transmitted through the white pixel portion of the 2D modulation image pattern and is blocked in the black pixel portion. Thus, the signal beam SB optically spatial-modulated by the 2D modulation image pattern is emitted from the spatial modulator 104.

Incidentally, the aforementioned example is one example of the 2D-modulation, and the application of the present invention is not necessarily limited to the aforementioned modulation method.

For example, as shown in FIG. 5(a), 2D-modulation method may be a method of converting 2-bit record data to 4-bit 2D modulation data, i.e. a so-called 2:4 modulation method. In the 2:4 modulation method, for example, a 2D modulation image pattern in which only the upper left pixel of a 2×2 matrix pixels is white corresponds to record data of "00", a 2D modulation image pattern in which only the upper right pixel is white corresponds to record data of "01", a 2D modulation image pattern in which only the lower left pixel is white corresponds to record data of "10", and a 2D modulation image pattern in which only the lower right pixel is white corresponds to record data of "11".

Alternatively, as shown in FIG. 5(b), 2D-modulation method may be a method of converting 6-bit record data to 9-bit 2D modulation data, i.e. a so-called 6:9 modulation method. In the 6:9 modulation method, 6-bit record data is expressed, depending on the positions of three white pixels, on a 3×3 matrix pixels.

Alternatively, any 2D digital modulation method may be used if capable of converting the record data to the 2D modulation image pattern and if capable of driving the spatial modulator 104 to spatial-modulate laser light.

As described above, the signal beam SB, optically spatial-modulated by the 2D modulation image pattern from the spatial modulator 104, and the reference beam RB form the interference pattern in the hologram recording medium 1 (more specifically, in the hologram recording layer 11). At this time, a record mark, as shown in FIG. 6, is formed on the surface of the hologram recording layer 11. By this, the record data is recorded into the hologram recording medium 1.

In FIG. 3 again, on the other hand, in the data reproduction, the spatial modulator 104 is controlled in a non-modulation condition (i.e. all-optical transmission condition). Thus, the laser light emitted from the recording/reproduction laser 101 passes through the half mirror 102, the half mirror 106, the half mirror 107, the dichroic mirror 109, and the objective lens 110, without being modulated by the spatial modulator 104, and is irradiated onto the hologram recording medium 1. This laser light becomes reference light for reproduction. In the hologram recording medium 1, detection light is generated from the reference light for reproduction and the interference pattern recorded in the hologram recording medium 1, and the detection light passes through the objective lens 110 and the dichroic mirror 109, and is reflected by the half mirror 107, and enters the 2D sensor 108. The 2D sensor 108 may be, for example, a CCD array, a CMOS sensor, or the like, and it outputs an electrical signal according to the quantity of incident light. In this manner, the 2D modulation image pattern with the white and black pixels, displayed by the spatial modulator 104 in the recording, is formed on the 2D sensor 108, and the 2D modulation image pattern is detected. The detected 2D modulation image pattern is demodulated or the like by the operation of the signal recording/reproducing device 313, resulting in the reproduction of the recorded data or the like.

On the other hand, the laser light emitted from the servo laser 121 (hereinafter referred to as a "servo beam TB") passes through a half mirror 122, is reflected by a mirror 123, and is further reflected by the dichroic mirror 109 with wavelength selectivity, and enters the objective lens 110. The objective lens 110 focuses the servo beam TB on the hologram recording medium 1 (more specifically, the address information layer 12), together with the light beam from the recording/reproduction laser 101. The servo beam TB is reflected by a reflective layer disposed on the back surface of the hologram recording medium 1, and is further reflected by the dichroic mirror 109, the mirror 123, and the mirror 122. Then, the servo beam TB is received by a four-division photo detector 125 through a cylindrical lens 124. The four-division photo detector 125 outputs an electrical signal corresponding to the quantity of received light. Thus, from a difference (e.g. push-pull signal) in the quantity of light of each light receiving area of the four-division photo detector 125, a tracking error signal is obtained, which indicates how much deviation exists from the guide groove for tracking servo control, which is formed on the hologram recording medium 1, to perform the tracking servo control. In addition, from a result of the detection by the four-division photo detector 125, the address information or the like can be obtained.

(3) Operation Principle of Hologram Recording/Reproducing Apparatus

Next, with reference to FIG. 7, an explanation will be given on an operation principle of the hologram recording/reproducing apparatus 300 in the embodiment. FIG. 7 is a flowchart conceptually showing a flow of a data recording operation by the hologram recording/reproducing apparatus 300 in the embodiment.

As shown in FIG. 7, firstly, the hologram recording medium 1 is loaded on the disc drive 301 (step S101).

Then, the management information recorded in the management information area 22 is obtained (step S102). By this, the hardening time information 23 is also obtained which is included in the management information for managing or controlling the recording or reproduction of the data in the user data area 21.

Then, various setup processes required for the data recording or reproduction are performed (step S103). After that, the data recording is performed (step S104).

During the data recording, under the control of the CPU 314 or the CPU 319, it is judged whether or not the data recording is temporarily stopped (step S105). The "stop" herein includes the case that the data recording is temporarily stopped in terms of specifications of the operation of the hologram recording/reproducing apparatus 300 or in terms of the standard of the hologram recording/reproducing apparatus 300, or similar cases, in addition to the case that an instruction to stop the data recording (e.g. halt, temporarily stop, or the like) is given by a user of the hologram recording/reproducing apparatus 300. Moreover, the case that the output of the data to be recorded onto the disc drive 301 from the host computer 302 is temporarily stopped is also included in the "stop" herein.

As a result of the judgment in the step S105, if it is judged that the data recording is temporarily stopped (the step S105: Yes), then a temporary stop process is performed (step S107). Incidentally, the temporary stop process will be detailed later (refer to FIG. 8 or the like).

On the other hand, as a result of the judgment in the step S105, if it is judged that the data recording is not temporarily stopped (the step S105; No), then under the control of the CPU 314 or the CPU 319, it is judged whether or not the data recording operation is ended (step S106). The "end" herein indicates the case that the recording of all the data to be recorded by this time's recording operation is finished, and the case that an instruction to end the recording is given by the user of the hologram recording/reproducing apparatus 300.

As a result of the judgment in the step S106, if it is judged that the data recording operation is not ended (the step S106: No), the operational flow returns to the step S104 again, and the data recording is continued.

On the other hand, as a result of the judgment in the step S106, if it is judged that the data recording operation is ended (the step S106: Yes), the data recording operation is ended.

Next, with reference to FIG. 8, the temporary stop operation in the step S107 in FIG. 8 will be explained. FIG. 8 is a flowchart conceptually showing a flow of the temporary stop operation in the step S107 in FIG. 7.

As shown in FIG. 8, if it is judged that the data recording is temporarily stopped, the countdown by the countdown timer 325 is started with that judgment as trigger (step S201). The initial value of the countdown is the hardening time indicated by the hardening time information 23. The countdown timer 325 performs the countdown (e.g. decrement of the initial value) by a unit of hour, minute, second, millisecond, or microsecond, using the hardening time indicated by the curing time information 23 as the initial value.

When the countdown is performed by the countdown timer 325, in parallel with this, it is judged whether or not the data recording is restarted (i.e. whether or not the data is additionally recorded), under the control of the CPU 314 or the CPU 319 (step S202). Here, it may be judged that the data recording is restarted if the data recording is restarted in terms of specifications of the operation of the hologram recording/reproducing apparatus 300 or in terms of the standard of the hologram recording/reproducing apparatus 300, or if an instruction to restart the data recording is given by the user of the hologram recording/reproducing apparatus 300. Moreover, it may be judged that the data recording is restarted if an inquiry about the next data recording (specifically an inquiry about a NWA described later) or the like is sent to the disc drive 301 from the host computer 302.

As a result of the judgment in the step S202, if it is judged that the data recording is not restarted (i.e. the state that the data recording is stopped is continued) (the step S202: No), the operation of judging whether or not the data recording is restarted is continued while the countdown by the countdown timer 325 is performed.

On the other hand, as a result of the judgment in the step S202, if it is judged that the data recording is restarted (the step S202: Yes), it is judged whether or not a current count value by the countdown timer 325 is greater than or equal to 0, under the control of the CPU 314, which constitutes one specific example of the "measuring device" of the present invention together with the countdown timer 325 (step S203). In other words, it is judged whether or not a time length between the judgment that the data recording is temporarily stopped and the restarting of the data recording is shorter than the hardening time indicated by the hardening time information 23. If the time length between the judgment that the data recording is temporarily stopped and the restarting of the data recording is shorter than the hardening time indicated by the hardening time information 23, the count value is greater than or equal to 0. On the other hand, if the time length the judgment that the data recording is temporarily stopped and the restarting of the data recording is longer than the hardening time indicated by the hardening time information 23, the count value is not greater than or equal to 0.

As a result of the judgment in the step S203, if it is judged that the current count value by the countdown timer 325 is greater than or equal to 0 (the step S203: Yes), an area portion in the hologram recording layer 11 which is irradiated with the laser light lastly before the temporary stop of the data recording has not completely hardened yet. Therefore, if the data recording is restarted, it is judged that it is possible to newly superimpose and record the data on the data recorded lastly before the temporary stop of the data recording. That is, it is judged that the multiplex-recording of the data can be performed in a additional recording boundary portion. Thus, under the control of the CPU 314, which constitutes one specific example of the "first controlling device" of the present invention, an address at which the data recording is restarted, i.e. an address that indicates a position at which the data is recorded next (NWA: Next Writable Address), is set to an address which is obtained by adding a predetermined offset value A to an address of the area portion in which the data is recorded lastly before the recording is stopped (LRA: Last Recorded Address).

The offset value A is a value obtained by converting a shift amount required for the multiplex-recording of the data, to an address value.

On the other hand, as a result of the judgment in the step S203, if it is judged that the current count value by the countdown timer 325 is not greater than or equal to 0 (the step S203: No), the area portion in the hologram recording layer which is irradiated with the laser light lastly before the temporary stop of the data recording has completely hardened. Therefore, if the data recording is restarted, it is judged that it is necessary to newly record the data without being superimposed on the data recorded lastly before the temporary stop of the data recording. That is, it is judged that the multiplex-recording of the data cannot be performed in the additional recording boundary portion. In other words, it is judged that it is necessary to perform the non-multiplex-recording of the data in the additional recording boundary portion. Thus, under the control of the CPU 314, which constitutes one specific example of the "second controlling device" of the present invention, the NWA is set to an address which is obtained by adding a predetermined offset value B, which is different from the offset value A, to the address (LRA) of the area portion in which the data is recorded lastly before the recording is stopped.

The offset value B uses a predetermined value so as to realize the state that the data (or its record mark) recorded lastly before the data recording is stopped does not overlap the data (or its record mark) recorded firstly when the data recording is restarted. Specifically, it is necessary to distance the record mark formed lastly when the data recording is stopped from the record mark formed firstly when the data recording is restarted (i.e. additionally recorded), by at least the size of the diameter of the record mark. In addition, after the data is recorded, the material which constitutes the hologram recording layer 11 may heat shrink or the like, to thereby cause a physical difference at a recording boundary between the record mark and its surroundings in some cases. Thus, if such a physical difference is caused, the data is newly recorded (i.e. needs to be additionally recorded) in view of the extent of the physical difference. Thus, a value which is obtained by converting a sum of the extent of the physical difference caused by the heat shrink or the like and the diameter of the record mark into the address value is used as the offset value B.

After that, the NWA set in the step S204 or the step S205 is passed from the disc drive 301 to the host computer 302, and the data recording is restarted from the area portion indicated by the NWA in accordance with an instruction of the host computer 302 (the step S104 in FIG. 7).

Next, with reference to FIG. 9 and FIG. 10, a detailed explanation will be given on the NWA set when the data recording is restarted (i.e. when the data is written once), in association with an aspect of the irradiation of the laser light in the hologram recording medium 1. FIG. 9 is a cross sectional view and a plan view conceptually showing a recording state of the hologram recording medium 1 when additional data recording operation is performed if it is judged that the current count value by the countdown timer 325 is greater than or equal to 0. FIG. 10 is a cross sectional view and a plan view conceptually showing a recording state of the hologram recording medium 1 when additional data recording operation is performed if it is judged that the current count value by the countdown timer 325 is not greater than or equal to 0.

As shown in FIG. 9, it is assumed that the data is recorded to the area portion indicated by the LRA before the data recording is stopped. Here, if it is judged that the current count value by the countdown timer 325 is greater than or equal to 0, what is set as the NWA is an address obtained by adding the value obtained by converting the shift amount required for the multiplex-recording into the address value (i.e. the offset value A) to the LRA. That is, if the data recording is restarted, the laser light is irradiated as shown in a dashed line in the cross sectional view of the hologram recording medium 1 shown in the upper part of FIG. 9, and the record mark is formed as shown in a dashed line in the plan view of the hologram recording medium 1 shown in the lower part of FIG. 9. After that, the normal multiplex-recording is performed.

On the other hand, as shown in FIG. 10, if it is judged that the current count value by the countdown timer 325 is not greater than or equal to 0, what is set as the NWA is an address obtained by adding the value obtained by converting the size that is required to make the data recorded lastly before the data recording is stopped not overlap the data recorded firstly when the data recording is restarted, to the address value (i.e. the offset value B) to the LRA. That is, if the data recording is restarted, the laser light is irradiated as shown in a dashed line in the cross sectional view of the hologram recording medium 1 shown in the upper part of FIG. 10, and the record mark is formed as shown in a dashed line in the plan view of the hologram recording medium 1 shown in the lower part of FIG. 10. After that, the normal multiplex-recording is performed.

As explained above, according to the hologram recording/reproducing apparatus 300 in the embodiment, it is not necessary to always perform the non-multiplex-recording of the data in the additional recording boundary portion. That is, if the data recording is restarted within a predetermined time (specifically, within the time length indicated by the hardening time information described above) after the data recording is once stopped, the data can be multiplex-recorded even in the additional recording boundary portion. By this, the data can be recorded in the area portion that cannot be effectively used because of the non-multiplex-recording, so that it is possible to record the data while effectively using the recording capacity of the hologram recording medium 1. In particular, when the sequential recording is performed, it is considered that the additional recording operation is frequently performed. Thus, it is possible to record the data while extremely effectively using the recording capacity of the hologram recording medium 1.

In addition, the hologram recording/reproducing apparatus 300 judges whether or not the multiplex-recording is performed in the additional recording boundary portion depending on the hardening time of the material that constitutes the hologram recording layer 11. Thus, it is possible to scatter the hardening time of the material. By this, it is possible to have wider options in the material that constitutes the hologram recording layer 11. In addition, the wider options in the material may allow a reduction in the manufacturing cost or an increase in the quality of the hologram recording medium 1, according to circumstances. Moreover, even if the hardening time of the material is scattered, it is possible to preferably receive such an advantage that the data can be recorded even in the area portion that cannot be effectively used because of the non-multiplex-recording, by performing the aforementioned operations.

Incidentally, in the aforementioned embodiment, an explanation is given on the aspect that the hardening time information 23 is recorded on the hologram recording medium 1. However, even if the hardening time information 23 is not recorded on the hologram recording medium 1, the aforementioned operations can be performed if the hologram recording/reproducing apparatus 300 stores the hardening time information 23 in the memory 315 or the like, which constitutes one specific example of the "storing device" of the present invention. Alternatively, even if the hardening time information 23 is not stored in the memory 315 or the like, or even if the hardening time information 23 is not recorded on the hologram recording medium 1, the aforementioned operations can be performed if the time length indicated by the hardening time information 23 or its quasi-time is set as the initial value of the countdown performed by the countdown timer 325.

Incidentally, the countdown timer 325 is preferably mounted or implemented on the CPU 314 by using firmware or the like. By this, the hologram recording/reproducing apparatus 300 in the embodiment can be realized, relatively easily and inexpensively, without changing the structure as the hardware of the hologram recording/reproducing apparatus 300.

Moreover, after the disc drive 301 passes the NWA set in the step S204 or the step S205 in FIG. 8 to the host compute 302, the host computer 302 preferably restarts the recording in a short time.

Incidentally, in the aforementioned embodiment, the explanation is given under the assumption that a track pitch of the hologram recording medium 1 is greater than the diameter of the record mark.

(4) Modified Operation Example

Next with reference to FIG. 11 and FIG. 12, a modified operation example of the hologram recording/reproducing apparatus 300 in the embodiment will be explained. FIG. 11 is a cross sectional view and a graph conceptually showing a relationship between an aspect of the data recording into the hologram recording medium 1 and a recording power, in a modified operation example. FIG. 12 is a cross sectional view and a graph conceptually showing a relationship among an aspect of the data recording into the hologram recording medium 1, an exposure time, and a optical pickup moving speed, in the modified operation example.

In general, even if the count value of the countdown timer 325 is greater than or equal to 0, as the count value is closer to 0, the material that constitutes the hologram recording layer 11 hardens more. In other words, the longer the time length between the stop of the data recording operation and the restarting of the data recording is, the more the material that constitutes the hologram recording layer 11 hardens. If the hardening of the material progresses, recording features in recording the data are different. Specifically, if the hardening of the material progresses, the sensitivity of the hologram recording layer 11 is reduced. Thus, if it is irradiated with the laser light with the same recording power, it is considered that it is hard to maintain the good recording quality of the data.

Thus, in the modified operation example, when the data is multiplex-recorded in the additional recording boundary portion as shown in the upper part of FIG. 11, the recording power of the laser light emitted from the optical pickup 100 (in particular, the recording/reproduction laser 101) is relatively increased, under the control of the CPU 314, which constitutes one specific example of the "third controlling device" of the present invention, as shown in the lower part of FIG. 11.

For example, when the data recording is restarted, the data is recorded with the recording power shown by white circles in the lower part of FIG. 11. At this time, the more the laser light irradiated after the restarting of the data recording overlaps the data recorded before the data recording is stopped, the more the recording power is preferably increased. That is, immediately after the data recording is restarted, a portion at which the irradiated laser light overlaps the data recorded before the data recording is stopped is relatively large. Thus, the recording power is increased more in accordance with that. On the other hand, as the data recording progresses, a portion at which the irradiated laser light overlaps the data recorded before the data recording is stopped is gradually reduced. Thus, the recording power is also gradually reduced in accordance with that. If a portion at which the irradiated laser light overlaps the data recorded before the data recording is stopped does not exist, the recording power is reset to the original value.

Moreover, as the count value is closer to 0 (i.e. the longer the time length between the stop of the data recording operation and the restarting of the data recording is), the recording power is preferably increased more. For example, if the data recording is restarted with a count value that is closer to 0 than a count value, which is obtained when the data recording is restarted with the recording power indicated by the white circles in the lower part of FIG. 11, is, the data is preferably recorded with the recording power shown by white squares in the lower part of FIG. 11.

By this, regardless of the extent of the hardening of the material that constitutes the hologram recording layer 11, it is possible to preferably maintain the recording quality of the recorded data.

Moreover, in addition to or instead of increasing the recording power, the exposure time of the laser light (i.e. irradiation time) may be increased, as shown in FIG. 12, under the control of the CPU 314, which constitutes one specific example of the "fourth controlling device" of the present invention. Increasing the recording power of the laser light and increasing the irradiation time of the laser light are common in the point of increasing the amount of energy given to the hologram recording layer 11. In the same manner, reducing the recording power of the laser light and reducing the irradiation time of the laser light are common in the point of reducing the amount of energy given to the hologram recording layer 11. Therefore, by increasing the irradiation time of the laser light, it is possible to receive the same benefits as those in the case of increasing the recording power of the laser light.

In this case, an aspect of increasing or reducing the irradiation time of the laser light is the same as that of increasing or reducing the recording power of the laser light.

Incidentally, increasing or reducing irradiation time of the laser light can be realized by increasing or reducing a moving speed of the optical pickup 100. That is, by reducing the moving speed of the optical pickup 100, it is possible to irradiate a certain area portion in the hologram recording layer 11 with the laser light for a longer time. On the other hand, by increasing the moving speed of the optical pickup 100, it is possible to irradiate a certain area portion in the hologram recording layer 11 with the laser light for a shorter time.

Alternatively, in addition to or instead of increasing or reducing a moving speed of the optical pickup 100, the rotational speed of the hologram recording medium 1 may be increased or reduced by the operation of the spindle motor 311, the irradiation timing of the laser light from the optical pickup 100 may be changed, or the irradiation time of the laser light from the optical pickup 100 may be directly increased or reduced.

The present invention is not limited to the aforementioned embodiments, and various changes may be made without departing from the essence or spirit of the invention which can be read from the claims and the entire specification. A hologram recording apparatus and method, a computer program, and a hologram recording medium, which involve such changes, are also intended to be within the technical scope of the present invention.

INDUSTRIAL APPLICABILITY

The hologram recording medium, the hologram recording apparatus and method, and the computer program according to the present invention can be applied to a hologram recording medium on which the data to be recorded is recorded as an interference pattern, and further to a hologram recording apparatus for recording information into the hologram recording medium. Moreover, they can be applied to the hologram recording apparatus or the like which is mounted on various computer equipment for consumer use or for commercial use, or which can be connected to various computer equipment.

The invention claimed is:

1. A hologram recording apparatus comprising:
   a recording device for recording record information into a hologram recording medium;
   a measuring device for measuring a time elapsed from the interruption of the recording of the record information to the restart of the recording of the record information;
   a first controlling device for controlling said recording device to restart the recording of the record information while the record information is multiplex-recorded, if the measured elapsed time is shorter than a time length in which the record information can be multiplex-recorded; and
   a second controlling device for controlling said recording device to restart the recording of the record information while the record information is not multiplex-recorded, if the measured elapsed time is longer than the time length in which the record information can be multiplex-recorded.

2. The hologram recording apparatus according to claim 1, wherein the time length in which the record information can be multiplex-recorded is a hardening time required to harden a material that constitutes the hologram recording medium after irradiation of a light beam.

3. The hologram recording apparatus according to claim 1, wherein said first controlling device controls said recording device to record the record information from a position shifted by a first offset amount from a position of a record mark formed by recording the record information before the stop.

4. The hologram recording apparatus according to claim 3, wherein the first offset amount is a shift amount in the multiplex-recording.

5. The hologram recording apparatus according to claim 1, wherein said second controlling device controls said recording device to record the record information from a position shifted by a second offset amount from a position of a record mark formed by recording the record information before the stop.

6. The hologram recording apparatus according to claim 5, wherein the second offset amount is greater than or equal to a size of a diameter of the record mark.

7. The hologram recording apparatus according to claim 5, wherein the second offset amount has an extent that is required to make the record mark formed by recording the record information before the stop not overlap the record mark of the record information recorded after the restarting of the recording.

8. The hologram recording apparatus according to claim 1, further comprising a storing device for storing time information which indicates the time length in which the record information can be multiplex-recorded.

9. The hologram recording apparatus according to claim 1, wherein time information is recorded on the hologram recording medium, the time information indicating the time length in which the record information can be multiplex-recorded.

10. The hologram recording apparatus according to claim 1, further comprising a third controlling device for controlling a recording power which is used when said recording device multiplex-records the record information, in accordance with the measured elapsed time, if the measured elapsed time is shorter than the time length in which the record information can be multiplex recorded.

11. The hologram recording apparatus according to claim 10, wherein said third controlling device increases the recording power as the measured elapsed time is relatively long.

12. The hologram recording apparatus according to claim 11, wherein said third controlling device increases the recording power, and then reduces the recording power step by step by a predetermined amount or continuously by a predetermined ratio.

13. The hologram recording apparatus according to claim 1, wherein
said recording device records the record information by irradiating a light beam, and
the hologram recording apparatus further comprises a fourth controlling device for controlling an irradiation time of the tight beam required to record the record information, in accordance with the measured elapsed time, if the measured elapsed time is shorter than the time length in which the record information can be multiplexed and recorded.

14. The hologram recording apparatus according to claim 13, wherein said fourth controlling device increases the irradiation time as the measured elapsed time is relatively long.

15. The hologram recording apparatus according to claim 13, wherein said fourth controlling device increases the irradiation time, and then reduces the irradiation time step by step by a predetermined amount or continuously by a predetermined ratio.

16. A hologram recording method in a hologram recording apparatus comprising: a recording device for recording record information into a hologram recording medium,
said hologram recording method comprising:
a measuring process of measuring a time elapsed from the interruption of the recording of the record information to the restart of the recording of the record information; a first controlling process of controlling said recording device to restart the recording of the record information while the record information is multiplex-recorded, if the measured elapsed time is shorter than a time length in which the record information can be multiplex-recorded; and
a second controlling process of controlling said recording device to restart the recording of the record information while the record information is not multiplex-recorded, if the measured elapsed time is longer than the time length in which the record information can be multiplex-recorded.

17. A computer program product in a computer-readable medium for tangibly embodying a program of instructions executable by a computer provided in a hologram recording apparatus comprising: a recording device for recording record information into a hologram recording medium; a measuring device for measuring a time elapsed from when the recording of the record information is stopped to when the recording of the record information is restarted; a first controlling device for controlling said recording device to restart the recording of the record information while the record information is multiplex-recorded, if the measured elapsed time is shorter than a time length in which the record information can be multiplex-recorded; and a second controlling device for controlling said recording device to restart the recording of the record information while the record information is not multiplex-recorded, if the measured elapsed time is longer than the time length in which the record information can be multiplex-recorded,
the computer program making the computer function as at least one portion of said measuring device, said first controlling device, and said second controlling device.

* * * * *